(12) United States Patent
Yamauchi et al.

(10) Patent No.: US 9,476,457 B2
(45) Date of Patent: Oct. 25, 2016

(54) ROLLING BEARING

(71) Applicants: Kiyoshige Yamauchi, Mie (JP); Katsunori Sone, Mie (JP); Naota Yamamoto, Mie (JP)

(72) Inventors: Kiyoshige Yamauchi, Mie (JP); Katsunori Sone, Mie (JP); Naota Yamamoto, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/407,100

(22) PCT Filed: Jun. 7, 2013

(86) PCT No.: PCT/JP2013/065854
§ 371 (c)(1),
(2) Date: Dec. 11, 2014

(87) PCT Pub. No.: WO2013/191014
PCT Pub. Date: Dec. 27, 2013

(65) Prior Publication Data
US 2015/0167743 A1    Jun. 18, 2015

(30) Foreign Application Priority Data
Jun. 19, 2012    (JP) .................................. 2012-137541

(51) Int. Cl.
*F16C 33/66*    (2006.01)
*F16C 33/76*    (2006.01)
(Continued)

(52) U.S. Cl.
CPC ........... *F16C 33/667* (2013.01); *F16C 33/782* (2013.01); *F16C 33/783* (2013.01);
(Continued)

(58) Field of Classification Search
CPC .............. F16C 33/6625; F16C 33/667; F16C 33/7816; F16C 33/782; F16C 33/7823; F16C 33/7826; F16C 33/7853; F16C 33/7856; F16C 33/7889; F16J 15/164; F16J 15/3204; F16J 15/3216; F16J 15/322; F16J 15/3256; F16J 15/3268
USPC ......... 384/469, 473, 477, 484, 485; 277/568
See application file for complete search history.

(56) References Cited

U.S. PATENT DOCUMENTS 3,262,743 A * 7/1966 McNicoll ................ F16C 19/36
384/485
5,492,416 A    2/1996 Gabelli et al.
(Continued)

FOREIGN PATENT DOCUMENTS

DE    19634689 A1 *    3/1998    .......... F16C 33/6607
DE    200 19 899        3/2001
(Continued)

OTHER PUBLICATIONS

European Search Report issued Oct. 23, 2015 in corresponding European Application No. 13 80 6955.
(Continued)

*Primary Examiner* — Phillip A Johnson
(74) *Attorney, Agent, or Firm* — Wenderoth, Lind & Ponack, L.L.P.

(57) ABSTRACT

A seal ring including filters is mounted to a rolling bearing. The bearing includes rolling elements disposed between an outer race and an inner race. The seal ring is made of a resin or a metal and covers an end opening of the bearing space defined between the outer race and the inner race. The filters are detachably fitted in oil flow holes formed in the seal ring. The filters catch foreign matter contained in lubricating oil. The seal ring is engaged by one of the outer race and the inner race. An annular member made of a material softer than the seal ring is fixed to the seal ring. The annular member serves as a lip facing the other of the inner and outer races with a gap left therebetween, or in abutment with the other of the inner and outer races.

15 Claims, 16 Drawing Sheets

(51) Int. Cl.
*F16J 15/32* (2016.01)
*F16C 33/78* (2006.01)
*F16C 19/36* (2006.01)
*F16C 33/72* (2006.01)

(52) U.S. Cl.
CPC ....... *F16C33/7813* (2013.01); *F16C 33/7823* (2013.01); *F16C 33/7833* (2013.01); *F16C 33/7889* (2013.01); *F16J 15/324* (2013.01); *F16C 19/364* (2013.01); *F16C 33/726* (2013.01); *F16C 2326/02* (2013.01)

(56) References Cited

U.S. PATENT DOCUMENTS

| | | |
|---|---|---|
| 2007/0158917 A1 | 7/2007 | Paykin |
| 2008/0124015 A1 | 5/2008 | Fujiwara et al. |
| 2013/0322803 A1 | 12/2013 | Gruber et al. |

FOREIGN PATENT DOCUMENTS

| | | | | |
|---|---|---|---|---|
| DE | 19958788 A1 | * | 6/2001 | ............ F16C 33/667 |
| DE | 10 2010 061 932 | | 6/2012 | |
| EP | 0600559 A1 | * | 6/1994 | .......... F16C 33/6666 |
| EP | 0661473 A1 | * | 7/1995 | ............ F16C 33/667 |
| GB | 1 298 144 | | 11/1972 | |
| GB | 1319953 A | * | 6/1973 | ............ F16C 33/667 |
| GB | 2 065 829 | | 7/1981 | |
| JP | 62-209223 | | 9/1987 | |
| JP | 06-323335 | | 11/1994 | |
| JP | 08303473 A | * | 11/1996 | |
| JP | 2002-213466 | | 7/2002 | |
| JP | 2002-250354 | | 9/2002 | |
| JP | 2005-273716 | | 10/2005 | |
| WO | 2011/019676 | | 2/2011 | |

OTHER PUBLICATIONS

International Search Report issued Aug. 13, 2013 in International (PCT) Application No. PCT/JP2013/065854.
Written Opinion of the International Searching Authority issued Aug. 13, 2013 in International (PCT) Application No. PCT/JP2013/065854 (with English translation).

* cited by examiner (a)

(b)

(a)

(b)

(a)

(b)

(a)

(b)

ROLLING BEARING

TECHNICAL FIELD

This invention relates to an oil lubricated rolling bearing, and more particularly a rolling bearing which is lubricated with oil that flows in through filters.

BACKGROUND ART

Rolling bearings are mounted in power transmission mechanisms of motor vehicles and various kinds of construction machines, such as transmissions, differentials and speed reducers, as well as in travel units in which are mounted these power transmission mechanisms.

In some of these devices, oil used to lubricate the power transmission mechanism is also used to lubricate the rolling bearings.

However, oil stored in the case of a power transmission mechanism, such as a transmission, differential or speed reducer, contains a relatively large amount of foreign objects such as wear dust from gears (which is typically iron dust). If such foreign objects enter one of the rolling bearings, they could become wedged between parts of the bearing, causing peeling of raceways and rolling surfaces, which in turn reduces the durability of the rolling bearing.

In order to prevent entry of foreign objects, it has been proposed to provide a seal ring mounted on the rolling bearing with filters capable of catching foreign objects. Such filters are mounted in oil flow holes formed in the seal ring. (See the below-identified Patent documents 1 and 2.)

PRIOR ART DOCUMENTS

Patent Documents

Patent document 1: JP Patent Publication 6-323335A
Patent document 2: JP Patent Publication 2002-250354A

SUMMARY OF THE INVENTION

Object of the Invention

The rolling bearing disclosed in either of Patent documents 1 and 2 includes a seal ring made of an elastomer (such a seal ring is hereinafter referred to as an "elastic seal member") formed with oil flow holes covered with filters.

Such an elastic seal member has no metal core and is mounted at a seal mounting portion of the rolling bearing, namely at an opening of the bearing, so as to be exposed to the outer environment. Thus, the elastic seal member could be deformed or moved out of the correct position, thus losing its expected sealing ability, under an external force that may act on the elastic seal member during assembling or transportation of the bearing, or when the assembled bearing is mounted in a machine.

In order to prolong the life of the seal ring while maintaining its expected sealability, it is necessary to control the interference between the elastic seal member and the bearing with high accuracy.

In this regard, since the elastic seal member is directly mounted on the bearing, in order to improve the accuracy of interference, it is necessary improve the dimensional accuracies of both of the elastic seal member and the bearing, which leads to increased manufacturing costs of the seal member and the bearing. Also, since the elastic seal member is formed by molding, it is difficult to improve its dimensional accuracy beyond a certain point.

If the interference is increased to ensure sealability, this results in increased torque of the bearing. Further, the same elastic seal member cannot be used in bearings which are different in size (especially those bearings of which the radial dimensions between the inner race and the outer race, in which the elastic seal member is to be mounted, is different). Rather, different seal members have to be prepared for these bearings, which also leads to increased manufacturing costs.

In the rolling bearings disclosed in Patent documents 1 and 2, the filters are presumably fixed to oil flow holes of the elastic seal member by fitting or by means of an adhesive.

If the elastic seal member is deformed due e.g. to thermal expansion, the portions of the filters fixed to the seal member could partially separate from the elastic seal member, or at least one of the filters may completely separate from the elastic seal member.

In either case, in order to prevent easy access of foreign objects into the rolling bearing, it is necessary to replace the seal ring with a new one. In order to replace the seal ring with a new one, it is necessary to disassemble at least the power transmission mechanism, which is not easy. It is therefore desired that the filters be mounted so as not to be easily separable from the seal ring.

An object of the present invention is to provide a seal ring to be mounted to a rolling bearing to which filters are mounted so as not to be easily separable from the seal ring, and of which high sealability is ensured.

Means for Achieving the Object

In order to achieve this object, the present invention provides a rolling bearing comprising an outer race, an inner race, rolling elements disposed between the outer race and the inner race, the outer race and the inner race defining a bearing space therebetween having first and second openings at first and second ends of the bearing space, respectively, a seal ring made of resin or metal, and covering the first opening, a filter detachably mounted in an oil flow hole formed in the seal ring and configured to catch foreign objects contained in lubricating oil, wherein the seal ring is engaged by one of the outer race and the inner race, and an annular member made of a material softer than the material forming the seal ring and fixedly mounted to the seal ring, the annular member forming a lip which is kept in abutment with the other of the outer race and the inner race or faces the other of the outer race and the inner race with a gap left therebetween.

With this arrangement, since the seal ring, which is fixed to one of the races, is made of a material harder than the material forming the annular member forming the lip, the seal ring is resistant to an external force, i.e. is less likely to be deformed under an external force. The filters are therefore fixedly mounted to the less deformable seal ring. This arrangement also makes it possible to replace only the annular member, which forms the lip and which is soft and thus is more likely to be damaged, with a new one.

Thus, the filters are less likely to be separable from the seal ring, and the seal ring maintains high sealability. It is also possible to prolong the life of the seal member using the seal ring, as well as the life of the bearing.

Since the annular member forming the lip and the seal ring fixed to one of the races are separate members from each other, it is possible to adjust the position of the annular ring relative to the seal ring with respect to the width direction of the bearing, and thus to easily adjust the interference of the lip. This in turn makes it possible to readjust the interference of the lip when the lip becomes worn, or to use the same seal ring and annular member for a bearing of a different model number having a different width.

In any of the above arrangements, the materials forming the seal ring and the annular member are not limited, provided the latter is softer than the former. For example, the seal ring may be made of resin or metal, while the annular member may be made of rubber, namely an elastomer softer than the resin or metal forming the seal ring.

In particular, the seal ring may be made of a glass fiber-reinforced resin. A glass fiber-reinforced resin is higher in rigidity and thus is less deformable under an external force, than a pure elastomer. Thus, by using this material, it is possible to ensure high sealability of the seal ring.

In any of the above arrangements, the filter may have an outer edge which is formed by insert molding so as to be integral with a frame member, and the frame member may be detachably mounted in the oil flow hole of the seal ring. With this arrangement, since the filter is detachable from the seal ring together with the frame member, if e.g. the filter becomes clogged, it is easily possible to remove the filter from the seal ring and mount a new filter. Thus it is possible to continuously use the seal ring simply by replacing the filter and the frame member with new ones.

The frame member may be formed of resin or rubber. The material forming the filter is not limited. For example, the filter may be a net member made of resin or metal.

The annular member and the seal ring may be arranged such that the annular member is guided by the radially outer surface of the seal ring. In particular, the annular member may be fitted on the radially outer surface of the seal ring with an interference fit.

The annular member may be positioned in the axial direction of the bearing by the inner end surface of the seal ring.

In this arrangement, the bearing is configured such that a dimension adjusting member can be disposed between the annular member and the inner end surface of the seal ring, whereby the interference between the lip and the other of the inner race and the outer race is adjustable by means of the dimension adjusting member.

In particular, by adjusting the axial position of the annular member relative to the seal ring, it is possible to easily adjust the interference of the lip of the seal member. With this arrangement, it is possible to readjust the interference of the lip when the lip becomes worn, or to use same seal ring and annular member for a bearing of a different model number having a different width.

In any of these arrangements, the bearing may further comprise an anti-pull-out means disposed between the annular member and the seal ring, and configured to prevent separation of the annular member and the seal ring from each other in the axial direction of the bearing.

In any of the above arrangements, the bearing may further comprise an anti-rotation means disposed between the annular member and the seal ring, and configured to prevent rotation of the annular member and the seal ring relative to each other in the circumferential direction.

By providing the anti-pull-out means and/or anti-rotation means between the seal ring and the annular member, which are separate members from each other, it is possible to prevent wear of the seal ring and the annular member due to slippage therebetween, thereby preventing deterioration in sealability.

The anti-pull-out means and/or the anti-rotation means may comprise protrusions and recesses formed on the radially opposed abutment surfaces or the axially opposed abutment surfaces, of the annular member and the seal member and in engagement with each other. Otherwise, the anti-pull-out means and/or the anti-rotation means may comprise coupling member such as a bolt or a pin through which the annular member and the seal ring are coupled together. Alternatively, the anti-pull-out means and/or the anti-rotation means may comprise an adhesive through which the annular member and the seal ring are adhesively bonded together. Further alternatively, the anti-pull-out means and/or the anti-rotation means may comprise a rough surface formed on an abutment surface of the seal ring with which the annular member is in abutment.

The anti-pull-out means and/or the anti-rotation means may comprise a combination of more than one of the above four specific configurations, too.

In any of the above arrangements, the seal ring may include a lip mounting portion having a sectional shape of a Japanese character "コ", wherein the annular member is fitted in the lip mounting portion such that the radially inner surface or the radially outer surface, and one axial side, of the annular member are directly or indirectly in abutment with the inner surface of the lip mounting portion.

Since the lip mounting portion has a "コ"-shaped section, the lip mounting portion protects the annular member against external force applied to the seal ring from around the seal ring. Since the lip mounting portion 27 has a "コ"-shaped section, if the annular member is fixed in position using an adhesive or a filler, the lip mounting portion can prevent leakage of such an adhesive or a filler.

Preferably, the seal ring and the annular member have maximum outer diameters smaller than the outer diameter of the outer race so that the seal ring and the annular member do not interfere with a housing retaining the outer race.

In any of the above arrangements, the net-shaped filter preferably has a mesh size of 0.3 to 0.7 mm, particularly preferably 0.5 mm.

If the mesh size of the filter is too large, large foreign objects tend to enter the bearing, and form impressions large enough to detrimentally influence the life of the bearing, on the raceways and rolling surfaces of the bearing. If the mesh size is too small, foreign objects could clog the filter, making it impossible to supply lubricating oil into the bearing.

A life test was conducted to determine the relationship between the sizes of impressions formed on the raceways and rolling surfaces of the bearing and the reduction rate of the life of the bearing due to the impressions. The results of the life test indicate that impressions smaller than a certain value do not influence the life of the bearing. An experiment was conducted to determine the relationship between the mesh size of the filter and the sizes of impressions formed by foreign objects that have passed through the filter.

The term "mesh size" herein used refers to the size of the openings of the net-shaped filter. During the experiment, it was confirmed that when the sizes of impressions exceeded 1 mm, the life of the bearings decreased sharply. It was also confirmed that in order to prevent entry of foreign objects that could form impressions larger than 1 mm, the mesh size has to be not larger than 0.5 mm. Thus, it was confirmed that the life of the bearings is especially favorable if the mesh size is not larger than 0.5 mm.

When the mesh size was not larger than 0.7 mm, impressions formed were not larger than 1.3 mm. If impressions formed are not larger than 1.3 mm, it is possible to keep the reduction rate of the life of the bearing to an acceptable level (60% of the life of the bearing having no impressions). To prevent clogging of the filters, the mesh size of the filter is preferably 0.3 mm or over.

In any of the above arrangements, at least a portion of the radially inner surface of the seal ring may be fitted on the bearing inner race with an interference fit.

During use of the rolling bearing, the seal ring is thermally expanded mainly in the radial direction as the temperature of e.g. oil increases. It is necessary to design the seal ring such that no gap forms that could allow entry of harmful foreign matter into the rolling bearing between the seal ring and the inner race even if the rolling bearing is heated to the maximum expected temperature and thus the seal ring is thermally expanded to the expected upper limit.

In order to prevent formation of such a gap, in a specific arrangement, the seal ring includes an engaging portion engaged by at least the inner race, and a wall portion extending radially outwardly from the engaging portion, with the engaging portion engaged by the inner race by being received in a recess formed in the inner race such that the seal ring is radially movable relative to the inner race when seal ring is thermally expanded.

In this arrangement, the seal ring is not thermally expanded beyond a point at which the engaging portion disengages from the recess. Thus, as far as the seal ring is within an expected temperature range, the engaging portion is always kept engaged in the recess with no gap present between the seal ring and the inner race that could allow entry of foreign matter into the bearing.

An annular member is fixed to the radially outer portion of the seal ring. The annular member forms a lip which abuts the outer race or faces the outer races with a minute gap left therebetween.

If the lip faces the outer race with a minute gap left therebetween, oil can flow through the minute gap. In this case, the distal end of the seal ring forms a labyrinth seal. Since this gap is very small, no harmful foreign objects can enter the rolling bearing through this gap. There will be no problem even if this gap disappears due to thermal expansion of the seal ring.

If the lip is in abutment with the outer race, since the lip is made of a material softer than the seal ring, even when the seal ring is thermally expanded, the lip is kept in abutment with the outer race due to its elasticity.

In any of these arrangements, the engaging portion has to be capable of preventing entry of foreign objects into the bearing through the gap between the seal ring and the inner race when the engaging portion is engaged in the recess formed in the inner race. The recess may be formed in the end surface or the radially outer surface, of the inner race.

The recess of the inner race may be a circumferentially extending seal groove.

In this case, the engaging portion includes a protrusion provided at the radially inner edge of the wall portion and configured to be engaged in the circumferentially extending seal groove such that the seal ring is radially movable relative to the inner race when the seal ring is thermally expanded.

Each of the engaging portion and the recess may comprise circumferentially spaced apart portions or may be circumferentially continuous over the entire circumference.

In any of these arrangements, the rolling bearing to which the seal ring is mounted is not limited in type, and may be a tapered roller bearing, of which the rolling elements are tapered rollers, or any other type of bearing, such as a deep groove ball bearing or an angular ball bearing, of which the rolling elements are balls, a cylindrical roller bearing, of which the rolling elements are cylindrical rollers, or a self-aligning roller bearing, of which the rolling elements are spherical rollers.

If the rolling bearing is a tapered roller bearing, the seal groove can be formed in the radially outer surface of the large-diameter flange of the inner race so as to open to the radially outer surface. If the rolling bearing is one of a deep groove ball bearing, an angular ball bearing, a cylindrical roller bearing, and self-aligning roller bearing, the seal groove can be formed in the radially outer surface of the inner race at its end so as to open to the radially outer surface.

Instead of the single protrusion, the engaging portion may comprise an inner protrusion located closer to the rolling elements, and an outer protrusion remote from the rolling elements. In this case, instead of a single seal groove, two seal grooves are formed in the inner race, namely an inner seal groove in which the inner protrusion is engaged, and an outer seal groove in which the outer protrusion is engaged.

In this arrangement, the seal ring can be more reliably brought into engagement with the inner race by the two axially spaced apart protrusions.

The bearing may be configured such that the length of the portion of the inner protrusion received in the inner seal groove is smaller than the length of the portion of the outer protrusion received in the outer seal groove.

With this arrangement, when pushing the seal ring into the opening of the bearing space to fix the seal ring in position, it is possible to easily fit the inner (and deeper) protrusion in the inner seal groove by resiliently or thermally deforming the inner protrusion. Also, since the outer protrusion is sufficiently deeply engaged in the seal groove, the seal ring can be kept in engagement with the inner race even when the seal ring is thermally expanded radially outwardly to a large degree.

Each of the inner protrusion and the outer protrusion may be circumferentially continuous over the entire circumference, or may comprise circumferentially spaced apart portions. In particular, the inner protrusion may comprise circumferentially spaced apart portions, while the outer protrusion may be circumferentially continuous over the entire circumference; the inner protrusion may be circumferentially continuous over the entire circumference, while the outer protrusion may comprise circumferentially spaced apart portions; the inner and outer protrusions may both be circumferentially continuous over the entire circumference; or the inner and outer protrusions may both comprise circumferentially spaced apart portions.

If the inner and outer protrusions comprise circumferentially spaced apart portions, the circumferentially spaced apart portions of the inner protrusion may be arranged alternately with those of the outer protrusions in the circumferential direction. With this arrangement, when the seal ring is pushed into the opening of the bearing space until it is fixed in position, the inner protrusion is less likely to be hidden from view by the outer protrusion, which makes it easier to visibly confirm that the inner (and deeper) protrusion is fitted in the inner seal groove.

Of the inner and outer protrusions, at least the outer protrusion may be configured to be axially movable in the outer seal groove. Since the outer protrusion is axially movable in the outer seal groove, even when the seal ring is thermally expanded, the outer protrusion can smoothly move in the seal groove in the radial direction without being restricted. In other words, no radially outward pulling force acts on the seal ring when the seal ring is thermally expanded, which in turn prevents damage to the filter.

In any of these arrangements, the outer seal groove may have its end open to the end surface of the inner race. If the outer seal groove is not open to the end surface of the inner race, it may be difficult to fit the outer protrusion in the outer seal groove (and the outer protrusion may become bent in the seal groove), because the outer protrusion is deeply fitted in the seal groove. In this arrangement however, since the outer seal groove is open to the end surface of the inner race, the outer protrusion can be easily fitted in the outer seal groove.

In this arrangement, a shaft may have a shoulder configured to abut the end surface of the inner race and close the opening of the outer seal at the end surface of the inner race, when the shaft is fitted in the radially inner surface of the inner race. With this arrangement, the outer protrusion can be reliably held in position in the outer seal groove. That is, after fitting the outer protrusion in the outer seal groove, it is possible to close the opening of the outer seal groove at the end surface of the inner race with the shoulder of the shaft.

When mounting any of the above-described rolling bearings in a machine, the rolling bearing is preferably arranged such that the end of the rolling bearing where the seal ring having the filter is mounted faces the outside of the machine.

Advantages of the Invention

According to the present invention, since the seal ring, which is fixed to one of the bearing races, is made of a material harder than the annular member forming the lip, the seal ring is less likely to be deformed under an external force. With this arrangement, the filter can be rigidly fixed to the less deformable seal ring, and also, it is possible to replace only the annular member forming the lip and made of a softer material with a new one.

As a result, the filter is less likely to separate from the seal ring, and also, it is possible to maintain high sealability. It is further possible to prolong the life of the seal member using the seal ring, as well as the life of the entire bearing.

BRIEF DESCRIPTION OF THE DRAWINGS

FIGS. 7(a) and 7(b) show the details of a seal member, of which FIG. 7(a) is an enlarged side view of a portion of the seal member, and FIG. 7(b) is an enlarged plan view of the same portion of the seal member.

FIGS. 9(a) and 9(b) show a fixing arrangement for a filter, of which FIG. 9(a) is a sectional view, and FIG. 9(b) is a side view of a portion of FIG. 9(a).

FIGS. 11(a) and 11(b) show a different fixing arrangement for the filter, of which FIG. 11(a) is a sectional view, and FIG. 11(b) is a side view of a portion FIG. 11(a).

DETAILED DESCRIPTION OF THE INVENTION

Figure 1:
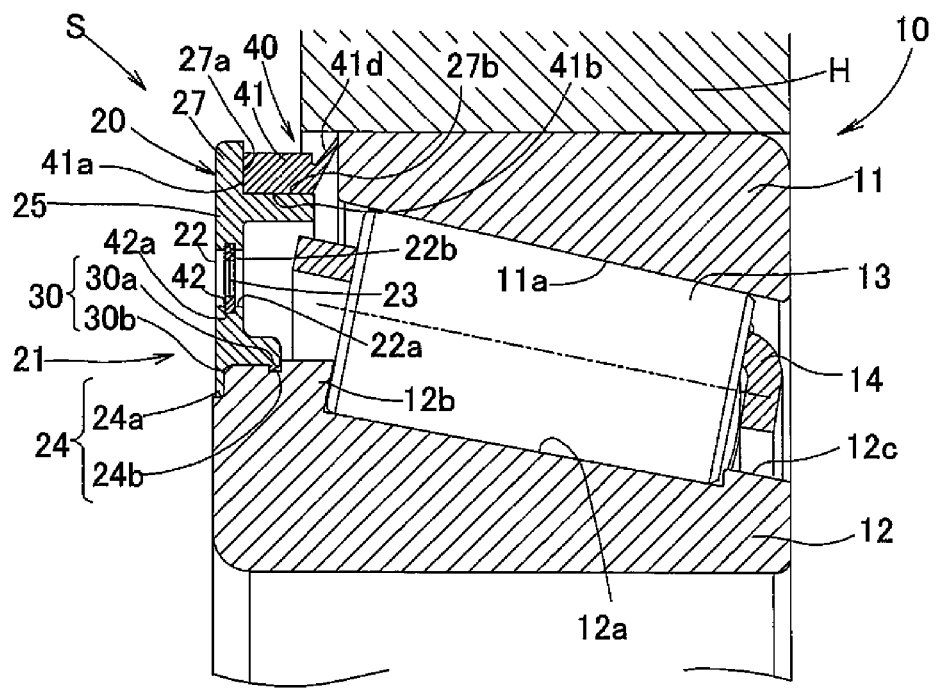
FIG. 1 is an enlarged sectional view of a portion of a first embodiment of the present invention.

The embodiments of the present invention are now described with reference to the drawings. FIG. 1 is a partial enlarged sectional view of a rolling bearing 10 embodying the present invention.

Figure 20:
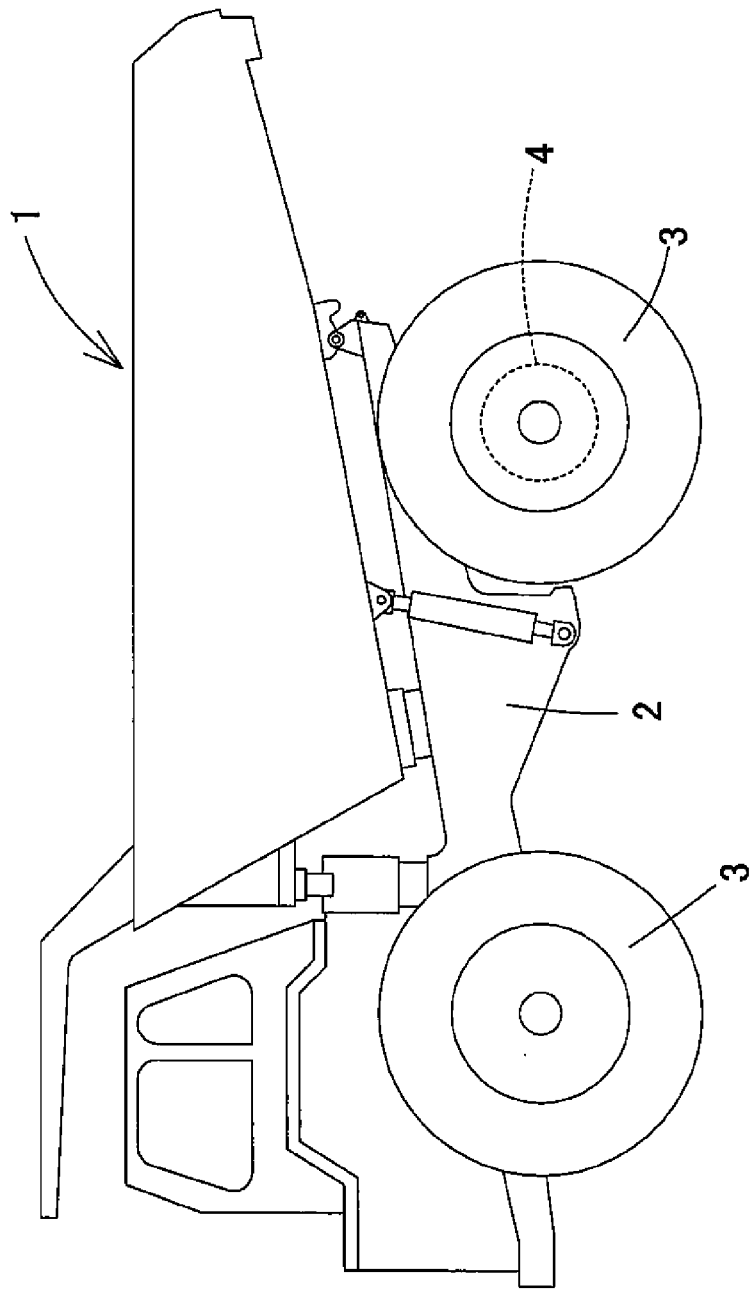
FIG. 20 shows the entity of a dump truck for use in a mine.
Figure 21:
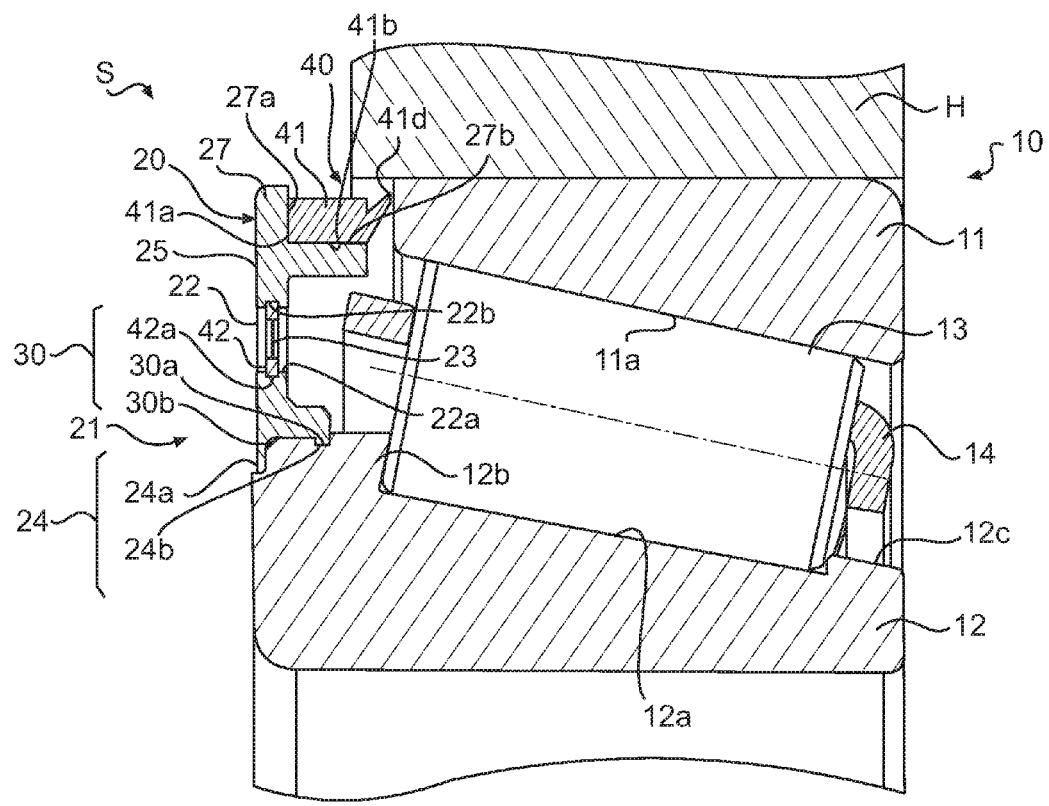
FIG. 21 is an enlarged sectional view of a portion of an embodiment of the present invention in which a gap is formed between the lip and one of the outer race and the inner race.

A plurality of the rolling bearings 10 are mounted in each travel unit 4 in a dump truck (construction machine) 1 used in mines and shown in FIG. 20, together with a power transmission mechanism T. The dump truck 1 includes a loading bed and a driver's cab which are supported by a chassis 2 which is in turn supported by tires 3 of drive wheels. The travel units 4 supply power to the tires 3 of the respective drive wheels.

Figure 19:
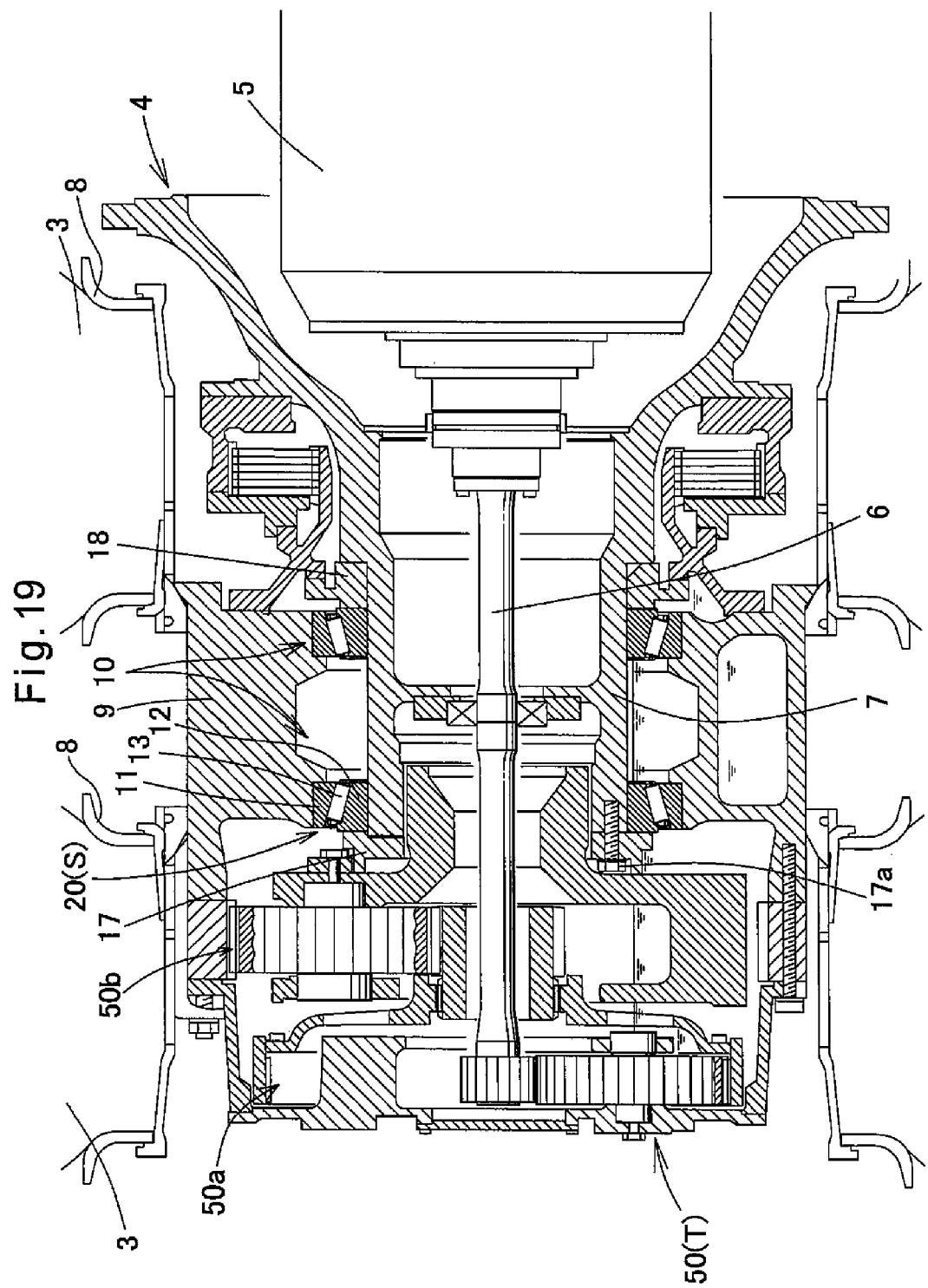
FIG. 19 is a vertical sectional view of a travel unit.

As shown in FIG. 19, each of the travel units 4 includes a travel motor 5 as a driving source, and a shaft 6 connected to the rotary shaft of the travel motor 5. The power transmission mechanism T, which comprises a speed reducer, is mounted around the distal end of the shaft 6.

A spindle 7, comprising a stationary axle, is disposed around the shaft 6. The drive wheel includes a wheel body 9 mounted around the spindle 7 through the rolling bearings 10. The rotation of the wheel body 9 is transmitted to the tire 3 of the drive wheel through rims 8.

The speed reducer forming each travel unit 4 is a planetary gear mechanism 50 including a first planetary gear assembly 50a and a second planetary gear assembly 50b which are configured such that the rotation of the shaft 6 is transmitted to the wheel body 9 through the planetary gear assemblies 50a and 50b after reducing the rotational speed. However, the speed reducer is not limited to the particular mechanism shown. For example, the speed reducer may comprise a planetary gear mechanism which is different from the one shown, or may be a speed reduction mechanism other than a planetary gear mechanism.

The rolling bearings 10 mounted between the spindle 7 and the wheel body 9 of this travel unit 4 comprise two tapered roller bearings mounted in juxtaposition with each other. The drive wheel with the tires 3 is supported by the spindle through these rolling bearings 10. Many of such rolling bearings 10 used in this type of construction machines are tapered roller bearings so that the rolling bearings can withstand large radial loads.

Referring to FIG. 19, each of the rolling bearings 10 includes an outer race 11 formed with a raceway 11a, and an inner race 12 formed with a raceway 12a, with rolling elements 13 in the form of tapered rollers disposed between the raceways 11a and 12a. The rolling elements 13 are retained in position in the circumferential direction of the bearing by a retainer 14.

The two rolling bearings 10 are arranged such that the small-diameter end surfaces of the rolling elements of one of the rolling bearings 10 face the small-diameter end surfaces of the rolling elements of the other of the rolling bearings 10. In other words, each of the rolling bearings 10 is arranged such that the distance between the raceway 12a of the inner race 12 and the raceway 11a of the outer race 11 decreases from the axially outer end of the rolling bearing 10 toward the other of the rolling bearings 10.

Preloads are applied to the respective rolling elements 13 by pressing the inner race 12 relative to the outer race 11 in the direction in which the distance between the raceways 11a and 12a decreases. In particular, the preloads are applied by tightening a bearing presser member 17 shown in FIG. 19 against the spindle 7 with bolts 17a, thereby axially compressing the inner races 12 of the respective rolling bearings 10 between the bearing presser member 17 and another bearing presser member 18 axially opposite from the member 17.

The power transmission mechanism T and the rolling bearings 10 are configured to be lubricated by the same common lubricating oil. In particular, since oil is stored in the casing of the travel unit 4 to a predetermined level, the power transmission mechanism T and the rolling bearings 10 are at least at their lower portions immersed in the oil stored in the casing of the travel unit 4. Thus, the component parts of the power transmission mechanism T and the rolling bearings 10 are lubricated with oil.

The inner races 12 of the bearings 10 are fitted on the non-rotatable spindle 7 so as to be non-rotatable. The outer races 11 are configured to rotate together with a rotatable housing H which is an integral part of the wheel body 9 of the drive wheel 3, or which is otherwise rotationally fixed to the wheel body 9.

In the casing, an oil flow passage is provided between the power transmission mechanism T and one of the rolling bearings 10 located close to the power transmission mechanism T. Thus, the power transmission mechanism T and the rolling bearings 10 are lubricated by the same common oil that flows through the oil flow passage.

Figure 2:
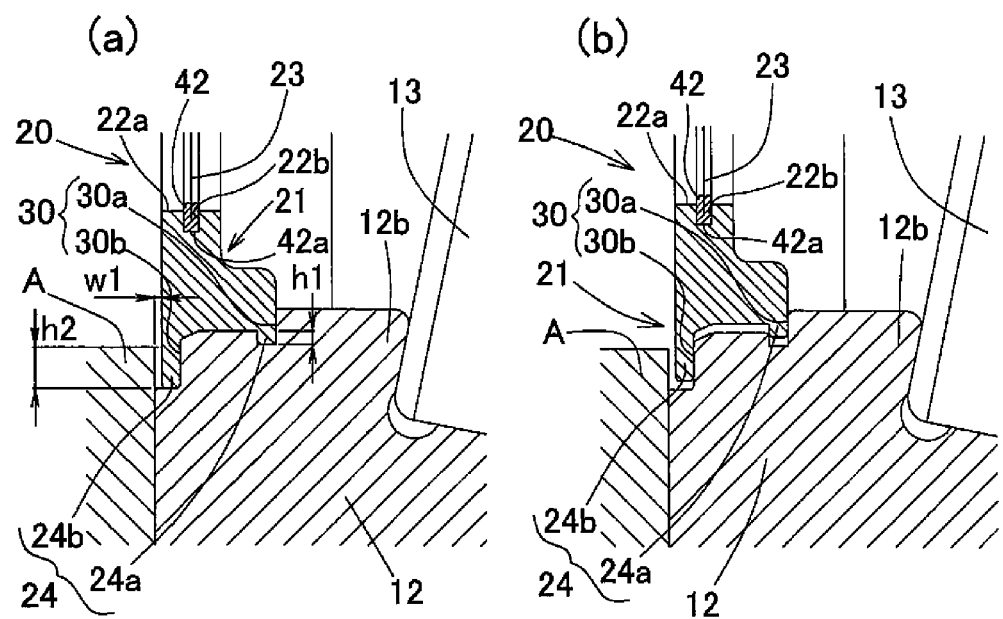
FIGS. 2(a) and 2(b) are enlarged views of a portion of FIG. 1.

In the embodiment, the oil flow passage is partially defined by the opening of one of the two rolling bearings 10 that is located close to the power transmission mechanism T, namely, one of the two openings of the bearing space defined between the outer race 11 and the inner race 12 of this rolling bearing 10 that is located close to the power transmission mechanism T. (The bearing 10 located close to the power transmission mechanism T is hereinafter referred to as the "first bearing 10", and the opening of the first bearing located close to the power transmission mechanism T is hereinafter referred to as the "first opening".) FIGS. 1 and 2 show a portion of the rolling bearing 10 located close to the power transmission mechanism T, and also show the first opening (opening on the left-hand side of FIG. 1).

A seal member S is mounted to the rolling bearing 10 located close to the power transmission mechanism T to cover, as shown in FIG. 19, the first opening, i.e. the opening of the bearing space of this bearing that is located close to the power transmission mechanism T.

If necessary, a similar seal member S may be mounted to the rolling bearing 10 remote from the power transmission mechanism T at one of the openings of this bearing 10 that is remote from the power transmission mechanism T.

Referring to FIG. 1, the seal member S includes a seal ring 20 comprising an engaging portion 21 kept in engagement with the inner race 12 of the rolling bearing 10, a wall portion 25 integral with and extending radially outwardly from the engaging portion 21, and a lip mounting portion 27 integrally provided at the radially outer edge of the wall portion 25.

The seal ring 20 is formed of a resin. Filters 23 are fixed to the seal ring 20 to cover oil flow holes 22 formed in the wall portion 25 of the seal ring 20.

As shown in FIGS. 1 and 2, the filters 23 are fixed to frame members 42 when forming the frame members 42 by resin molding with the peripheral edge portions of the filters 23 embedded in the resin such that the peripheral edge portions of the filters 23 are embedded in and fixed to the respective frame members 42.

The frame members 42 are detachably fitted in the inner surfaces 22a of the respective oil flow holes 22. Thus, the filters 23, which are fixed to the respective frame members 42, are detachably mounted to the seal ring 20 through the frame members 42. The frame members 42 may be made of rubber.

Since the filters 23 are detachable from the seal ring 20 together with the frame members 42, it is possible to easily dismount any one of the filters 23 and the corresponding frame member 42 from the seal ring 20 and replace them with new ones, if e.g. the filter 23 is clogged with foreign matter or the mesh of the filter 23 is broken. By replacing any defective filter 23 and the corresponding frame member 42 with new ones, it is possible to continuously use the seal ring 20. This reduces the cost and the burden on the environment.

In order to mount the filters 23 and the frame members 42 to the seal ring 20, as shown in FIGS. 1 and 2 by way of example, each frame member 42 is fitted at its outer edge portion 42a in a circumferentially extending recess 22b formed in the inner surface 22a of the corresponding oil flow hole 22 such that no gap forms between the frame member 42 and the seal ring 20. The recesses 22b preferably extend the entire circumferences of the respective oil flow holes 22 so that the outer edges 42a of the frame members 42 are snugly fitted in the recesses 22b over the entire circumferences of the outer edges 42a. The frame members 42 may be fitted in the respective recesses 22b by elastically deforming the frame members 42 and/or the filters 23.

Figure 9:
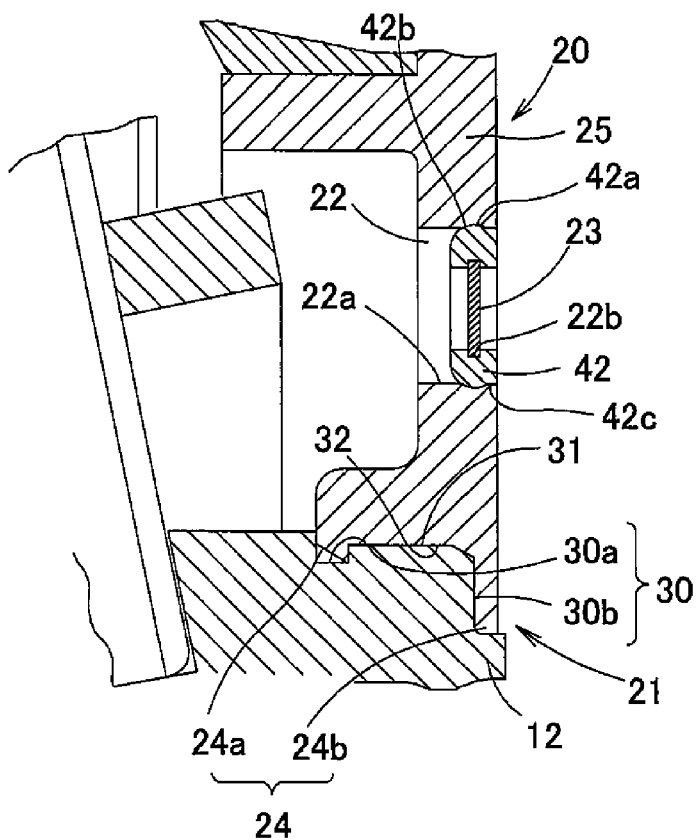
Figure 9:
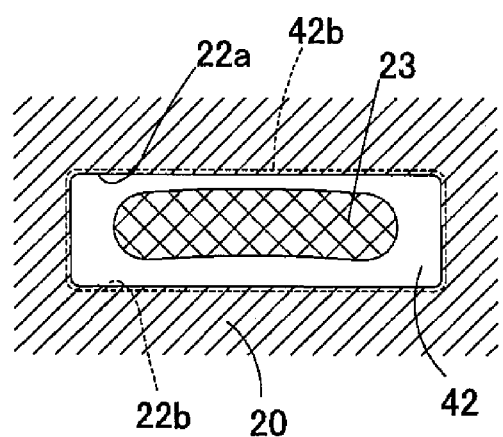

In the arrangement shown in FIGS. 9(a) and 9(b), the outer edge 42a of each frame member 42 is formed with a curved portion 42b having a circular arc section, and a tapered portion 42c provided on the outside (relative to the bearing) of the curved portion 42b such that its diameter gradually decreases outwardly of the bearing. The combination of the curved portion 42b and the tapered portion 42c allows the pressing force applied between the inner surface 22a of the oil flow hole 22 and the outer edge 42a of the frame member 42 to concentrate on the portions of the inner surface 22a and the curved portion 42b that are in contact with each other.

This in turn allows the outer edge 42a of the frame member 42 and the inner surface 22a of the oil flow hole 22 to be deformed to an optimum degree, thus allowing the frame member 42 to be resiliently engageable with the seal ring 20.

Figure 10:
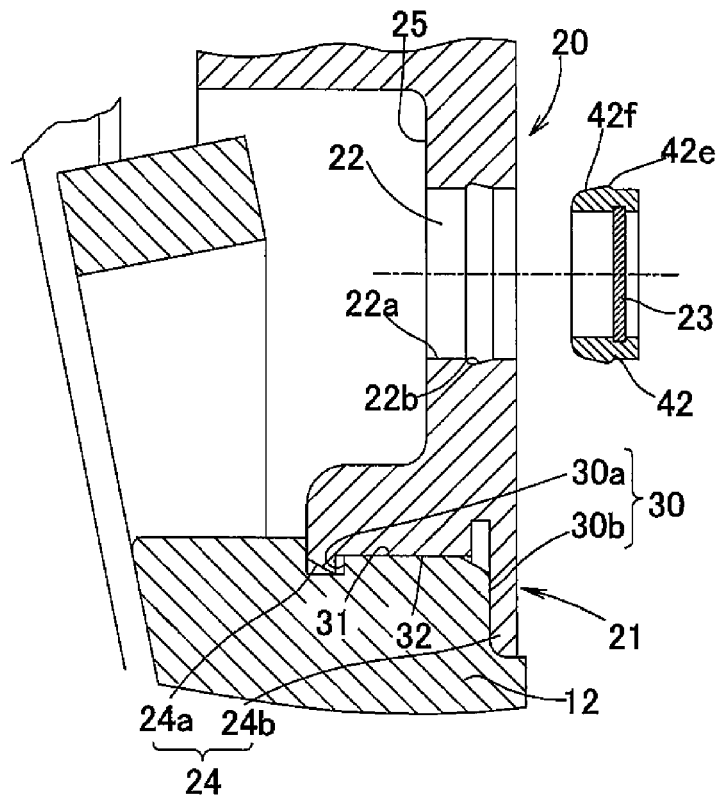
FIGS. 10(a) and 10(b) show a fixing arrangement for the filter, and are sectional views before and after the filter is fixed in position, respectively.
Figure 10:
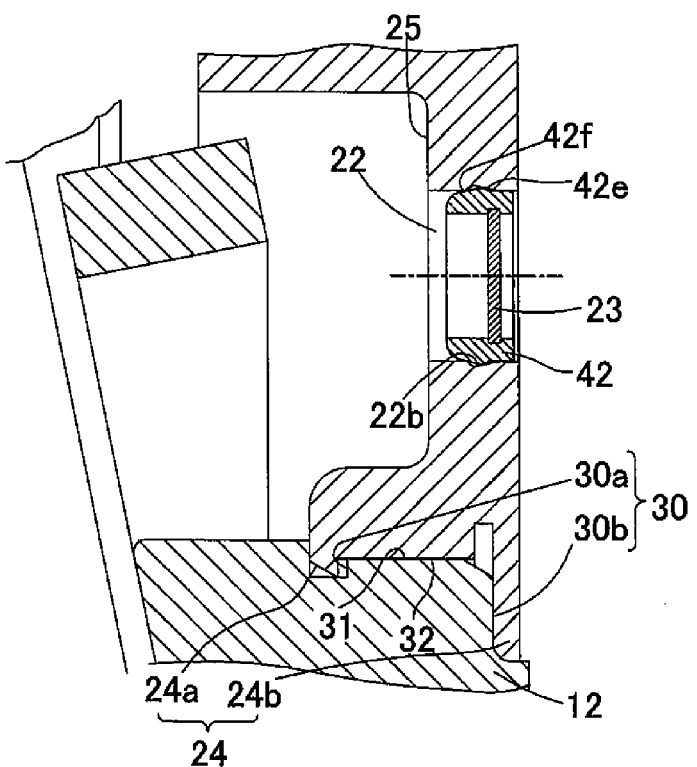

In an alternative arrangement shown in FIGS. 10(a) and 10(b), the outer edge 42a of each frame member 42 is formed with an anti-separation protrusion 42e having a circular arc section, and a tapered portion 42f provided on the inside (relative to the bearing) of the anti-separation protrusion 42e such that its diameter gradually decreases inwardly of the bearing. With this arrangement, when the filter 23 and the frame member 42 are mounted to the seal ring 20, the tapered portion 42f of the outer edge 42a of the frame member 42 slides along the inner surface 22a of the corresponding oil flow hole 22, so that the frame member 42 can be smoothly fitted in position. Once the frame member 42 is completely fitted in position, the anti-separation protrusion 42e is fitted in a recess 22b formed in the inner surface 22a of the oil flow hole 22 to extend in the circumferential direction of the hole 22, thereby preventing separation of the frame member 42.

This arrangement also allows the outer edge 42a of the frame member 42 and the inner surface 22a of the oil flow hole 22 to be deformed to an optimum degree, thus allowing the frame member 42 to be resiliently engageable with the seal ring 20.

Figure 11:
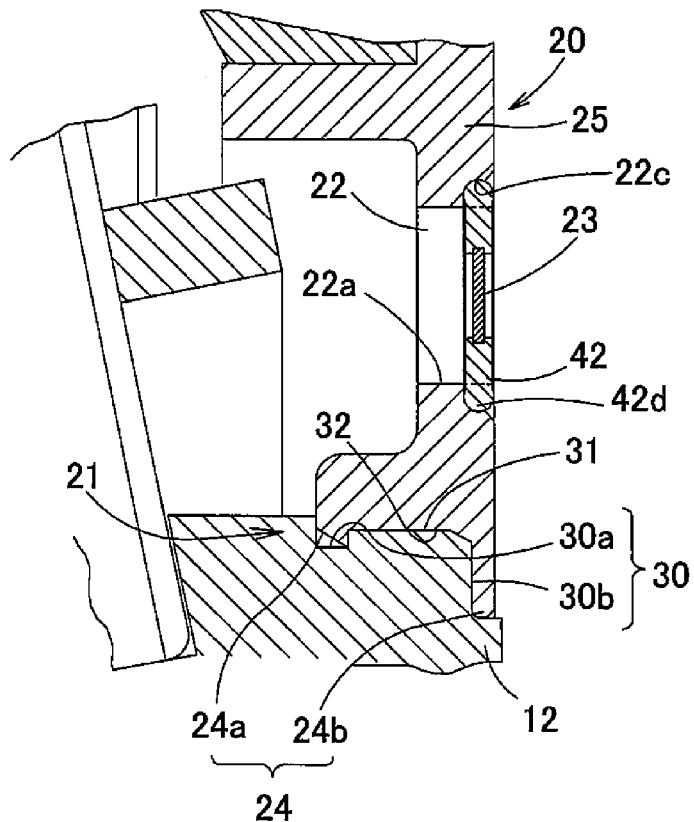
Figure 11:
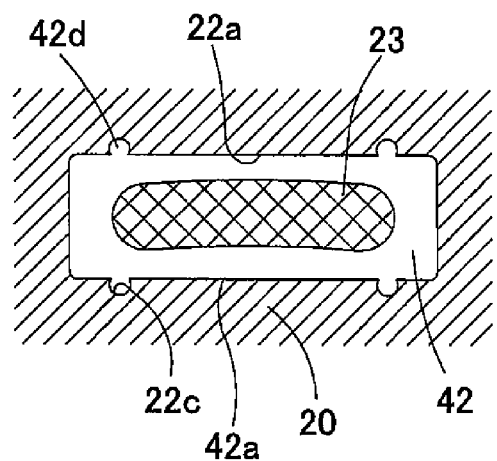
Figure 12:
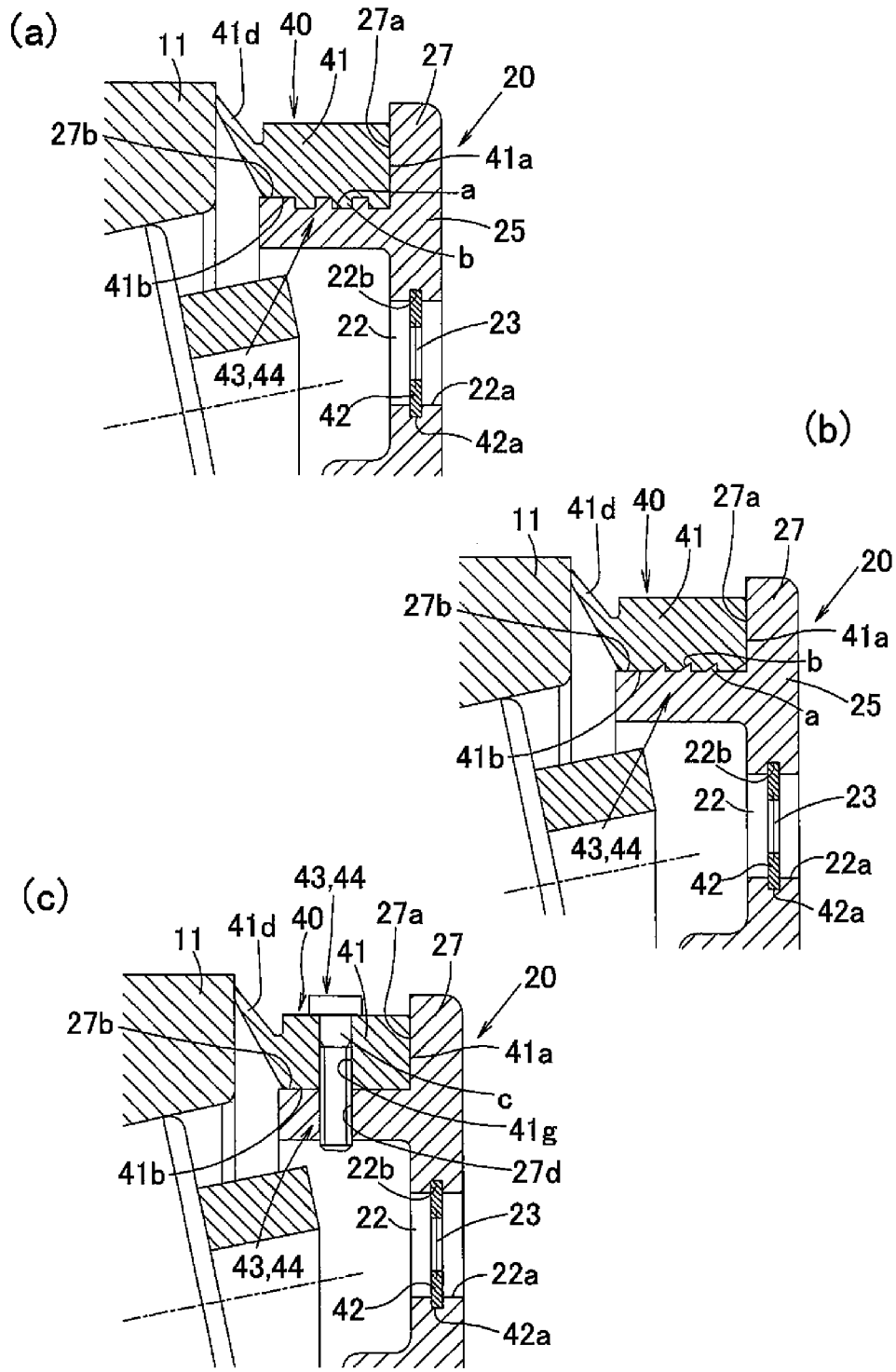
FIG. 12(a) is an enlarged sectional view of a portion of a fifth embodiment of the present invention.
FIGS. 12(b) and 12(c) are enlarged sectional views of portions of respective modifications of the fifth embodiment.
Figure 13:
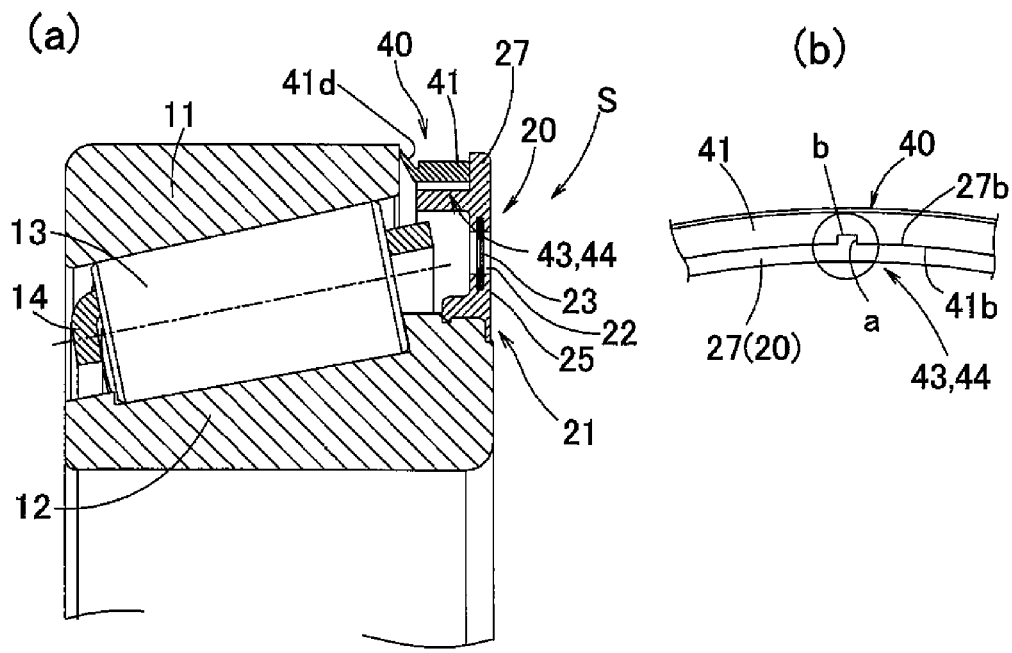
FIG. 13(a) is an enlarged sectional view of a portion of a sixth embodiment of the present invention.
FIG. 13(b) is a side view of a portion of FIG. 13(a).
Figure 14:
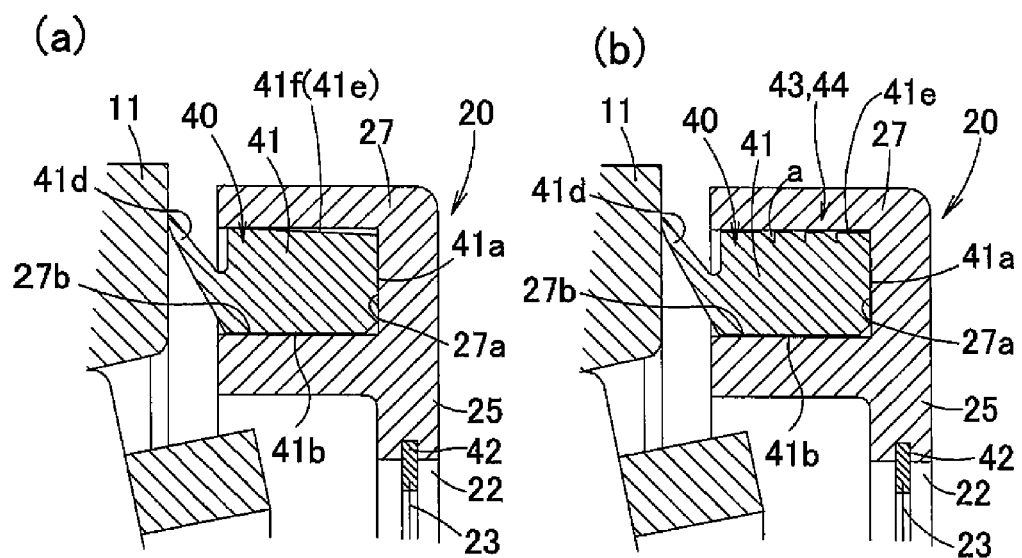
FIG. 14(a) is an enlarged sectional view of a portion of a seventh embodiment of the present invention.
FIG. 14(b) is an enlarged sectional view of a portion of a modification of the seventh embodiment.

Further alternatively, the frame members 42 may be detachably mounted to the seal ring 20 in the manner shown in FIGS. 11(a) and 11(b). In this arrangement, each oil flow hole 22 is formed with recesses 22 in the inner surface 22a thereof, and each frame member 42 is formed with spherical protrusions 42d on its outer surface which are configured to be fitted in the respective recesses 22c, thereby keeping the frame member 42 resiliently in engagement with the seal ring 20. Since the spherical protrusions 42d and the recesses 22c both spherical surfaces, and the spherical surfaces are kept in surface contact with each other, the frame member 42 can be resiliently brought into engagement with the seal ring 20.

Still further alternatively, the frame members 42 may be detachably mounted to the seal ring 20 by means of screws.

The material forming the filters 23 is not limited. For example, the filters 23 may be nets made of a resin or a metal.

In this embodiment, the nets forming the filters 23, the frame members 42 and the seal ring 20 are formed of a polyamide resin or resins. However, these members may be formed of a resin or resins other than polyamide resins, such as polyacetal (POM), polycarbonate (PC), polyethylene terephthalate (PET), polybutylene terephthalate (PBT), polyetheretherketone (PEEK), polyphenylene sulfide (PPS), polytetrafluoroethylene (PTFE), polysulfone (PSF), polyethersulfone (PES), polyimide (PI) or polyetherimide (PEI). These resins may be in the form of fiber-reinforced resins. Glass fiber-reinforced resins include PA (polyamide) 46+GF, and PA (polyamide) 66+GF.

The content ratio of glass fiber in such a glass fiber-reinforced resin is set at an optimum value taking into consideration the shrinkage factor of the resin and the necessary strength, and should be 15 to 35%, preferably 25 to 30%. Generally speaking, the higher this content ratio, the smaller the shrinkage factor, and thus the easier it is to control the dimensions of the above members when formed into shapes. Conversely, the lower this content ratio, the lower the strength of the resin tends to be, and thus the more easily the above members are deformable. By setting this content ratio at 25 to 30%, the shrinkage factor and the strength are achieved in the most balanced manner.

The filters 23 and/or the seal ring 20 may be formed of, instead of a glass fiber-reinforced resin, a carbon fiber-reinforced resin, a polyethylene fiber-reinforced resin, or an aramid fiber-reinforced resin.

The filters 23, the frame members 42 and the seal ring 20 may be formed of the same material. Otherwise, the filters 23 may be formed of a material different from, but substantially equal in linear expansion coefficient to, the material or materials forming the frame members 42 and the seal ring 20, or formed of a material different from, and higher in linear expansion coefficient than, the material or materials forming the frame members 42 and the seal ring 20.

With this arrangement, when the frame members 42 and the seal ring 20 are thermally expanded, the filters 23 are thermally expanded to substantially the same degree as, or to a greater degree than, the frame members 42 and the seal ring 20. This prevents the filters 23 from being overstretched and thus becoming damaged.

If, however, there is no possibility of damage to the filters 23 when the frame members 42 and the seal ring 20 are thermally expanded, the filters 23, the frame members 42 and the seal ring 20 may be formed of any materials different from one another without taking into consideration the linear expansion coefficients of these materials.

As shown in FIG. 1, an annular member 40 is fixed to the lip mounting portion 27 of the seal ring 20. The annular member 40 is made of a rubber softer than the material forming the seal ring 20. The annular member 40 is fixedly fitted on the outer periphery of the lip mounting portion 27. Due to its resilience, the annular member 40 is pressed against the lip mounting portion 27. If the annular member 40 is made of a synthetic rubber, such a synthetic rubber may be nitrile rubber, acrylic rubber, urethane rubber or fluoro-rubber.

The annular member 40, which is fixed to the lip mounting portion 27, serves as a lip 41 kept in abutment with the outer race 11. Since the seal ring 20, which is fixed to the inner race 12, is made of a material harder than the material forming the lip 41 or the annular member 40, the seal ring 20 is less likely to be deformed under an external force. The filters 23 and the frame members 42 can therefore be rigidly fixed to the seal ring 20, which is made of a less deformable material. The annular member 40, which forms the lip 41 and which is soft and prone to damage, can be dismounted from the seal ring 20 for replacement with a new one. This prolongs the life of the seal member S and the life of the bearing carrying the seal member S.

Since the lip 41 or the annular member 40 is a separate member from the seal ring 20, it is possible to adjust the position of the annular member 40 in the width direction of the bearing, relative to the seal ring 20.

Figure 3:
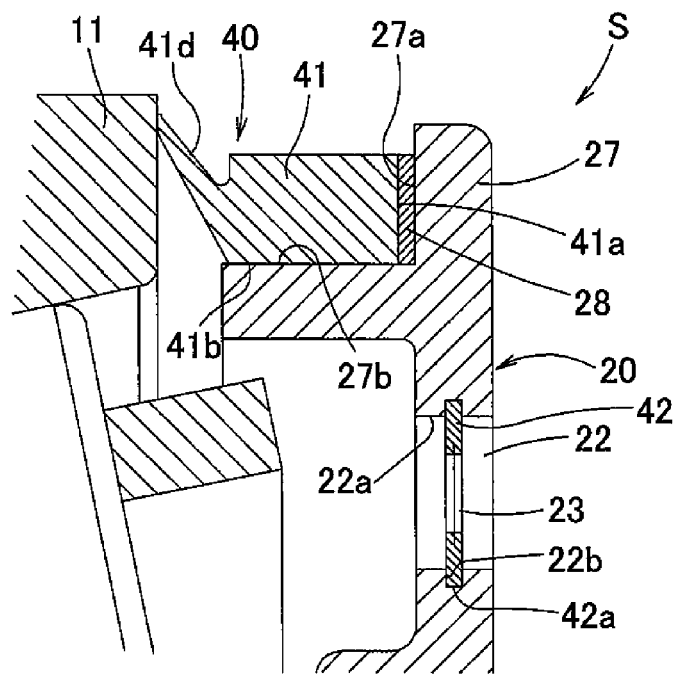
FIG. 3 is an enlarged sectional view of a portion of FIG. 1 in which a dimension adjusting member is inserted.

In particular, this adjustment is possible e.g. by inserting a dimension adjusting member 28 between the axially outer end surface of the annular member 40 and the axially inner end surface 27a of the lip mounting portion 27 (see FIG. 3). Such a dimension adjusting member 28 may be a plate-shaped member (shim) which can be selected from among a plurality of shims different in thickness from each other.

In this arrangement, since the position of the annular member 40 relative to the seal ring 20 is adjustable, it is possible to easily adjust the lip interference of the seal member S. This makes it possible not only to readjust the interference of the lip 41 when the lip 41 becomes worn, but also to use the same seal ring 20 and annular member 40 in bearings of different model numbers which differ in width.

Preferably, an anti-pull-out means 43 and/or an anti-rotation means 44, such as those shown in FIGS. 12 to 15, are provided to prevent axial separation of the seal ring 20 and the annular member 40, which are separate members from each other, from each other, and/or to prevent rotation of the seal ring 20 and the annular member 40 relative to each other, to prevent wear of these members due to relative sliding between these members, thereby maintaining high sealability.

If, as the anti-pull-out means 43 and the anti-rotation means 44, the seal ring 20 and the annular member 40 are adhesively bonded together, it is possible to use an ordinary adhesive for this purpose. Otherwise, these members may be bonded together by vulcanization. These members are preferably bonded together between the axially outer end surface of the annular member 40 and the inner end surface 27a of the lip mounting portion 27, and between the inner peripheral surface 41b of the annular member 40 and the outer peripheral surface 27b of the lip mounting portion 27.

In the radial direction, the annular member 40 is preferably not only adhesively bonded to the seal ring 20 but also fitted on the seal ring 20 with an interference fit, in order to more reliably prevent slippage between these members in the rotational direction. However, by using an anti-pull-out means 43 and an anti-rotation means 44 other than adhesive bonding, it is possible to replace the annular member 40 with a new one.

Figure 7:
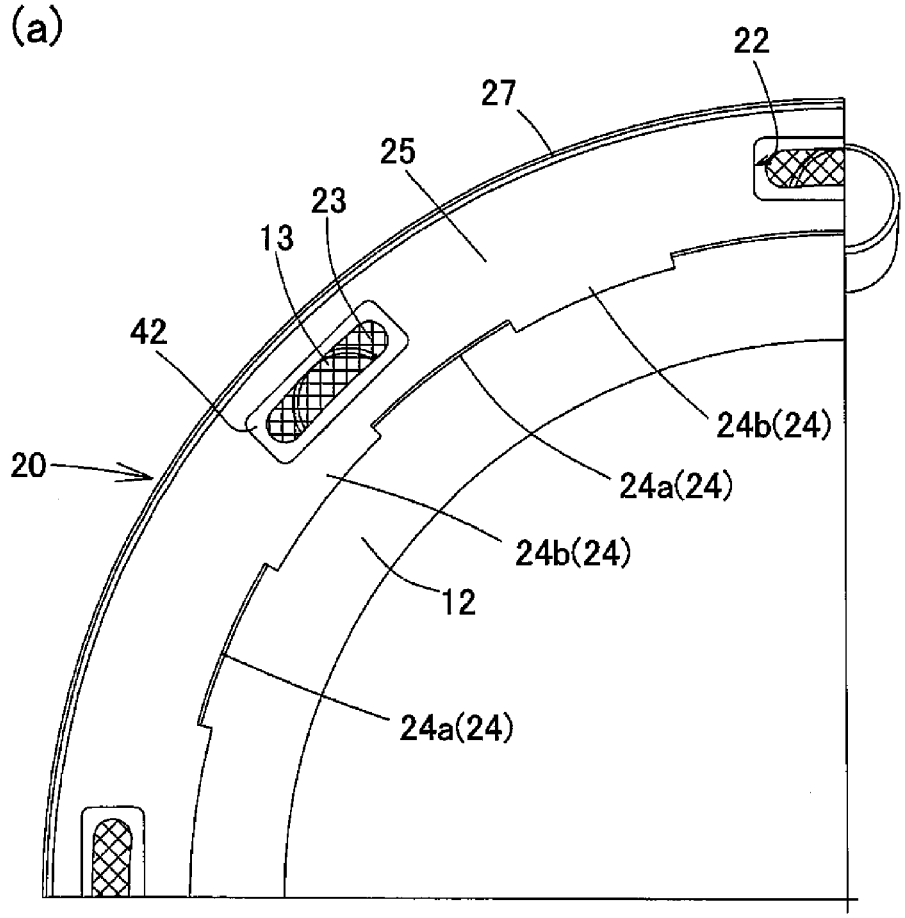
Figure 7:
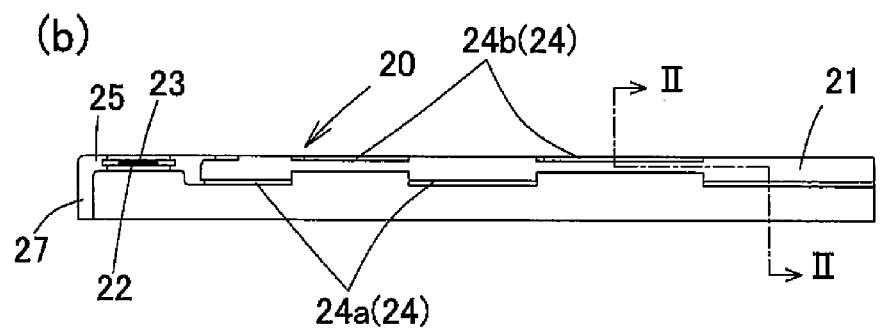
Figure 8:
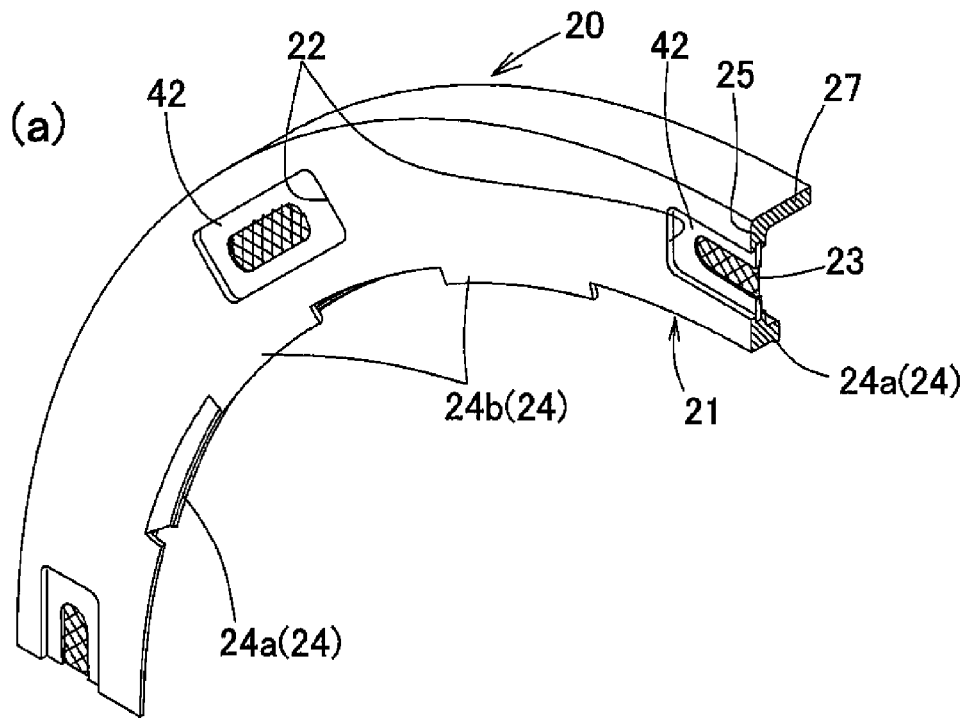
FIGS. 8(a) and 8(b) are perspective views showing the details of the seal member.
Figure 8:
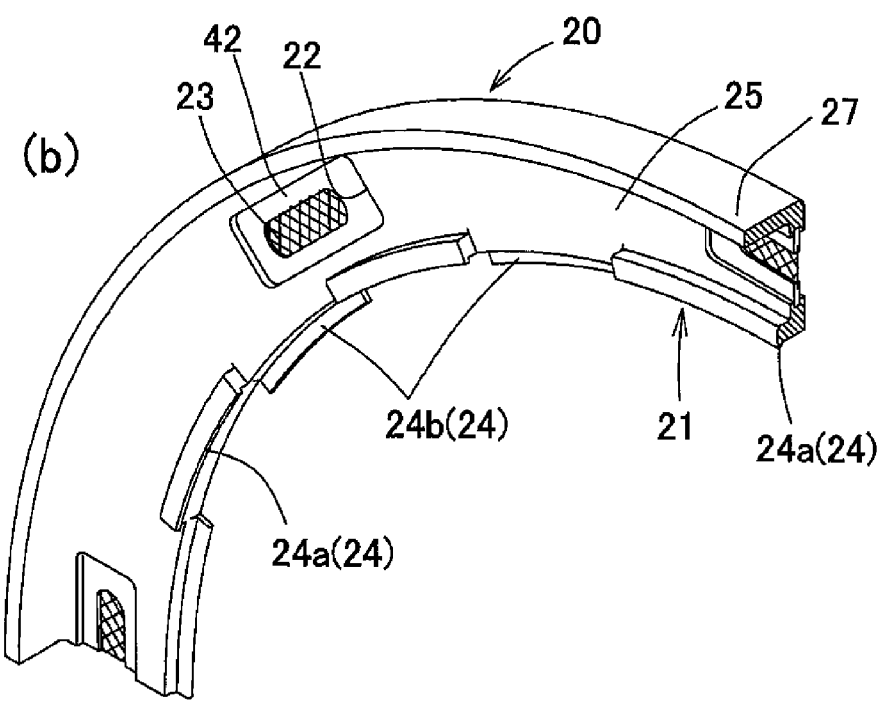

As shown in FIGS. 7 and 8, the oil flow holes 22 may be rectangular elongated holes as seen from one side of the bearing. The oil flow holes 22 are arranged in the circumferential direction of the seal ring 20 so as to be spaced apart from each other. The oil flow holes 22 are not limited in shape, number and intervals therebetween. In this regard, the oil flow holes 22 are not limited to rectangular in shape as viewed from one side of the bearing, and may be elongated holes having the shape of a circular arc as viewed from one side of the bearing.

The filters 23 may be net members made of a resin and having a mesh size of about 0.1 to 1 mm. In the embodiment, the filters 23 are net members made of a resin and having mesh sizes of 0.5 mm. The mesh sizes of the filters 23 are determined according to the diameters of foreign substances supposed to be caught by the filters 23. Optimum mesh sizes at which the life of the bearing is the longest will be described later.

The engaging portion 21 of the seal ring 20, which is provided at the radially inner portion of the seal ring 20, is engaged in circumferential seal grooves (recesses) 30 formed in the inner race 12 such that the seal ring 20 can move in the radial direction relative to the inner race 12 when the seal ring 20 is thermally expanded.

The engaging portion 21 and the seal grooves 30 are now described in a detailed manner. As shown in FIG. 2, the engaging portion 21 of the seal ring 20 includes protrusions 24 radially inwardly extending from the radially inner edge of the wall portion 25.

The protrusions 24 consist of inner protrusions 24a located closer to the rolling elements 13, and outer protrusions 24b remote from the rolling elements 13. The seal grooves 30 consist of inner seal grooves 30a in which the inner protrusions 24a are received, and outer seal grooves 30b in which the outer protrusions 24b are received.

With the protrusions 24 received in the respective seal grooves 30, the seal ring 20 is kept in engagement with the inner race 12 so as to be radially movable when the seal ring 20 is thermally expanded.

By the two axially spaced apart protrusion groups 24a and 24b, it is possible to reliably keep the seal ring 20 in engagement with the inner race 12.

As shown in FIG. 2(a), the bearing 10 is configured such that, with lubricating oil for the rolling bearing 10 not yet heated (steady state), the lengths h1 of the portions of the inner protrusions 24a received in the inner seal grooves 30a are smaller than the lengths h2 of the portions of the outer protrusions 24b received in the outer seal grooves 30b.

With this arrangement, when pushing the seal ring 20 into the opening of the bearing space to fix the seal ring 20 in position, it is possible to easily fit the inner (and deeper) protrusions 24a in the inner seal grooves 30a by resiliently or thermally deforming the protrusions 24a.

Since the lengths h2 of the portions of the outer protrusions 24b received in the outer seal grooves 30b are larger than the lengths h1, when the temperature rises, and the seal ring 20 is thermally and radially expanded to a large extent as shown in FIG. 2(b), the outer protrusions 24b remain engaged in the outer seal grooves 30b. Thus, in this expanded state too, the seal ring 20 remains in engagement with the inner race 12 with no gap present therebetween that could allow entry of harmful foreign matter into the rolling bearing 10.

In particular, the lengths h2, namely the lengths of the portions of the outer protrusions 24b received in the outer seal grooves 30b in the steady state, are determined so as to prevent formation of a gap that could allow entry of harmful foreign matter into the rolling bearing between the seal ring 20 and the inner race 2 even if the rolling bearing 10 is heated to the maximum expected temperature and thus the seal ring 20 is thermally expanded to the expected upper limit (see FIG. 2(b)).

Thus, as far as the seal ring 20 is within an expected temperature range, the outer protrusions 24b are always kept received in the outer seal grooves 30b with no gap present between the seal ring 20 and the inner race 12 that could allow entry of foreign matter into the bearing.

In this embodiment, as shown in FIGS. 7(a), 7(b), 8(a) and 8(b), the inner protrusions 24a are arranged alternately with the outer protrusions 24b in the circumferential direction.

With this arrangement, when the seal ring 20 is pushed into the opening of the bearing space until it is fixed in position, the inner protrusions 24a are less likely to be hidden from view by the outer protrusions 24b, which makes it easier to visibly confirm that the inner (and deeper) protrusions 24a are fitted in the inner seal grooves 30a. FIGS. 1, 2(a) and 2(b) show sectional views of the seal ring 20, taken along line II-II of FIG. 7(b), to clearly show the positional relationship between the inner protrusions 24a and the outer protrusions 24b and the radial dimensions of the protrusions 24a and 24b.

In this embodiment, the inner protrusions 24a and the outer protrusions 24b are arranged such that the inner protrusions 24a do not circumferentially overlap with the inner protrusions 24b at all. In other words, the two circumferential ends of each inner protrusion 24a are axially aligned with one circumferential end of one of the two circumferentially adjacent outer protrusions 24b and one circumferential end of the other of the two circumferentially adjacent outer protrusions 24b, respectively.

However, the inner protrusions 24a and the outer protrusions 24b may be arranged otherwise. That is, the inner protrusions 24a and the upper protrusions 24b may be arranged so as to circumferentially overlap with each other.

In this embodiment, as shown in FIG. 2(a), with the outer protrusions 24b received in the respective outer seal grooves 30b, axial gaps w1 are defined between the outer protrusions 24b and the outer end walls of the outer seal grooves 30b. In other words, the outer seal grooves 30b have axial widths larger than the axial widths of the outer protrusions 24b by the axial dimensions of the axial gaps w1. The outer protrusions 24b are therefore axially movable in the outer seal grooves 30b by the distances equal to the axial dimensions of the axial gaps w1.

Since the outer protrusions 24b are axially movable in the outer seal grooves 30b, even when the seal ring 20 is thermally expanded, the outer protrusions 24b can smoothly move in the outer seal grooves 30b in the radial direction without being restricted. In other words, no radially outward pulling force acts on the seal ring 20 when the seal ring 20 is thermally expanded, which in turn prevents damage to the filters 23.

As shown in FIG. 2(a), the outer seal grooves 30b have ends open to the end surface of the inner race 12. A shoulder A of an axle is configured to be brought into abutment with the end surface of the inner race 12 when the axle is fixedly fitted in the inner race 12. Thus, after the outer protrusions 24b are fitted in the outer seal grooves 30b, the openings of the outer seal grooves 30b can be closed by the shoulder A of the axle.

With this arrangement, the outer protrusions 24b can be easily fitted into the outer seal grooves 30b through their openings at the end surface of the inner race 12. By closing the openings with the shoulder A of the axle thereafter, it is possible to prevent separation of the outer protrusions 24b from the outer seal grooves 30b.

Now description is made of how the seal ring 20 operates. During use of the travel unit 4, due to rotation of the power transmission mechanism T and the rolling bearings 10, oil is partially splashed from the power transmission mechanism T toward the side surface of one of the rolling bearings 10.

Since the seal ring 20 is fitted at the first opening (of the bearing space of the first bearing 10), oil is splashed toward the seal ring 20, and a portion of such oil collides against the filters 23 fitted in the oil flow holes 22.

The filters 23 allow passage of oil that has collided against the filters 23, while catching any foreign objects contained in the oil that has collided against the filters 23 and larger than the mesh sizes of the filters 23. Oil that has passed through the filters 23 flows into the bearing space and lubricate the first rolling bearing 10.

The filters 23 thus prevent harmful foreign objects discharged from the power transmission mechanism T from entering the interior of the rolling bearing 10.

If any filter 23 is clogged with foreign objects, this filter 23 and the corresponding frame member 42 can be replaced with new ones.

Figure 4:
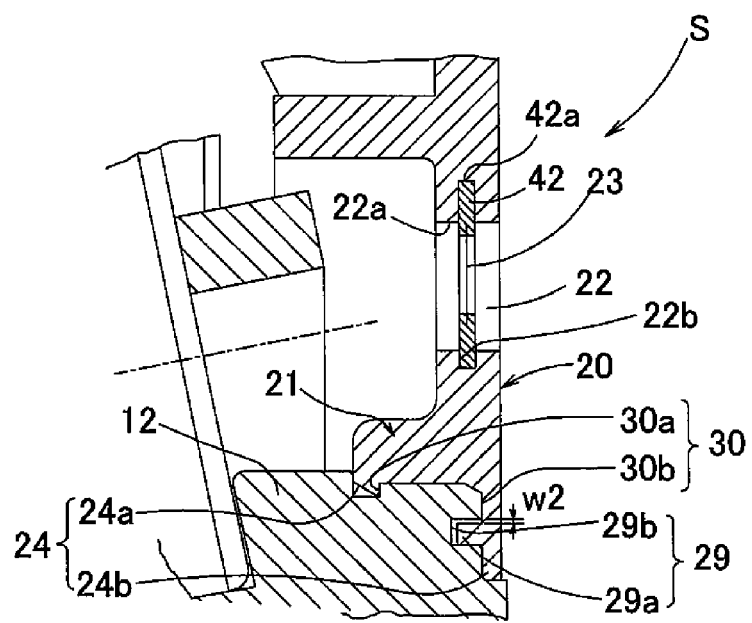
FIG. 4 is an enlarged sectional view of a portion of a second embodiment of the present invention.

FIG. 4 shows a second embodiment of the present invention, in which engaging means 29 are provided for preventing radial movement of the seal ring 20. This embodiment is otherwise structurally identical to the first embodiment. Thus, only what differs from the first embodiment is described below.

As shown in FIG. 4, each of the engaging means 29 includes an engaging projection 29a provided on the engaging portion 21 of the seal ring 20, and an engaging recess 29b formed in each of the outer seal grooves 30b of the inner race 12.

The engaging protrusions 29a protrude in the axial direction from the intermediate portions of the respective outer protrusions 24b with respect to the protruding directions of the outer protrusions 24b. The engaging recesses 29b are formed in the inner surfaces of the respective outer seal grooves 30b so as to be recessed in the axial direction such that the engaging projections 29a are engageable in the respective engaging recesses 29b.

The dimension of each engaging recess 29b in the radial direction of the bearing is larger by dimension w2 than the dimension of the corresponding engaging projection 29a in the radial direction of the bearing. Thus, with the engaging projections 29a fitted in the respective engaging recesses 29b, the engaging projections 29a are movable in the radial direction of the bearing.

In this embodiment, the dimension of each engaging recess 29b in the circumferential direction of the bearing is equal to the dimension of the corresponding engaging projection 29a in the circumferential direction of the bearing. However, the former may be larger than the latter so that the engaging projections 29a can move in the engaging recesses 29b in the circumferential direction of the bearing.

With the engaging portion 21 of the seal ring 20 received in the seal grooves 30 of the inner race 12, the engaging projections 29a of the seal ring 20 are fitted in the engaging recesses 29b of the seal grooves 30, thereby preventing more-than-necessary movement of the seal ring 20 in the radial direction of the bearing, and also preventing its movement in the circumferential direction of the bearing.

Thus, when the seal ring 20 is thermally expanded, it is possible to prevent more-than-necessary movement of the seal ring 20 in the radial direction of the bearing (especially its radially outward movement when the seal ring is expanded from a cold state), and also prevent rotation of the seal ring 20 in the circumferential direction relative to the inner race 12.

Since the dimensions of the engaging recesses 29b in the radial direction of the bearing are larger than the dimensions of the engaging projections 29a in the radial direction of the bearing, when mounting the seal ring 20 to the bearing, the engaging projections 29a can be smoothly fitted in the engaging recesses 29b even if the seal ring 20 is heated.

Figure 5:
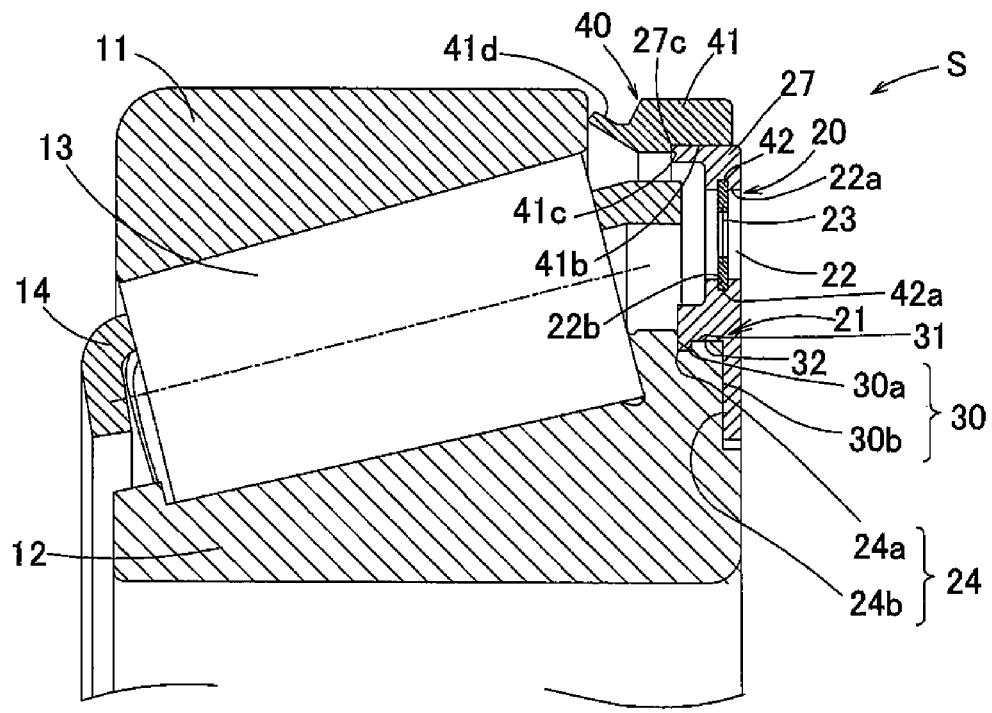
FIG. 5 is an enlarged sectional view of a portion of a third embodiment of the present invention.

FIG. 5 shows a third embodiment of the present invention, in which the annular member 40, forming the lip 41, is formed with a positioning shoulder 41c on its radially inner surface. The positioning shoulder 41c is configured to engage an end edge 27c (or a shoulder) of the lip mounting portion 27 of the seal ring 20, thereby axially positioning the annular member 40 relative to the seal ring 20.

In this and other embodiments, a seal ring fitting portion 31 of the engaging portion 21, defined between the inner protrusions 24a and the outer protrusions 24b, is fitted on an inner race fitting portion 32 between the inner seal grooves 30a and the outer seal grooves 30b with an interference fit. The seal ring fitting portion 31 and the inner race fitting portion 32 are fitted together with a predetermined interference fit by heating and expanding the resin seal ring 20 and fitting the thus expanded seal ring 20 onto the inner race 12. The interference fit improves sealability of the seal ring 20.

Figure 6:
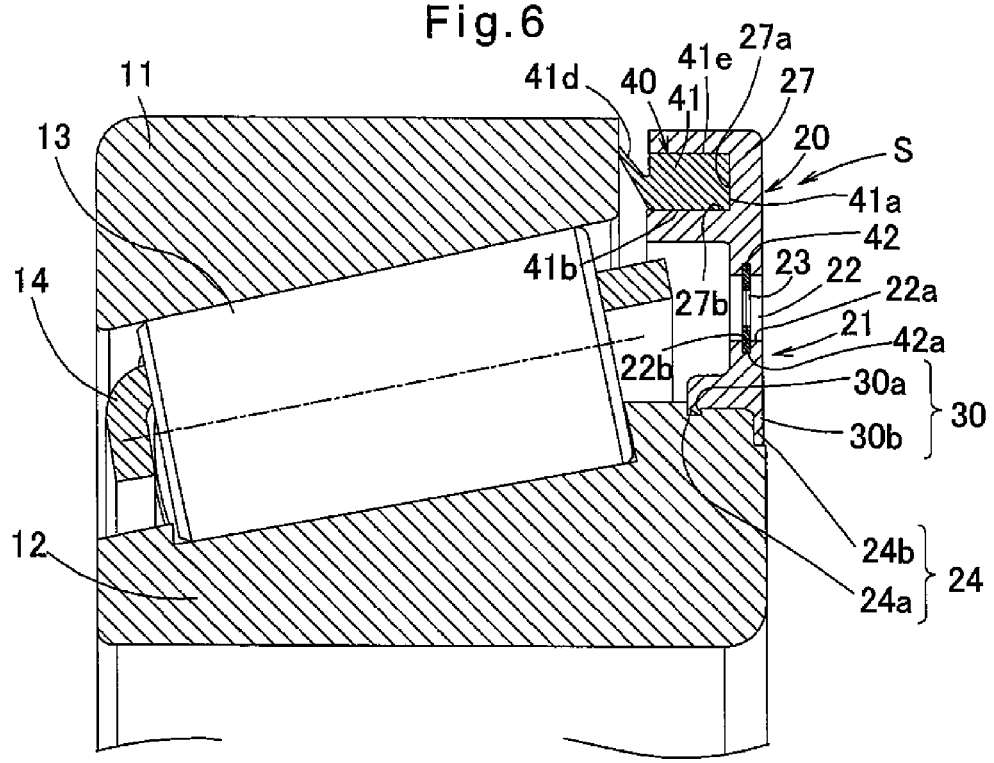
FIG. 6 is an enlarged sectional view of a portion of a fourth embodiment of the present invention.

FIG. 6 shows a fourth embodiment of the present invention, in which the lip mounting portion 27 of the seal ring 20 has a sectional shape of the Japanese character "⊐".

Since the lip mounting portion 27 has a "⊐"-shaped section, the lip mounting portion 27 protects the annular member 40 against external force applied to the seal ring 20 from around the seal ring 20. Since the lip mounting portion 27 has a "⊐"-shaped section, if the annular member 40 is fixed in position using an adhesive or a filler, the lip mounting portion 27 can prevent leakage of such an adhesive or a filler.

Different variations are feasible for the anti-pull-out means 43, which prevents separation of the annular member 40 and the seal ring 20 from each other in the axial direction, and for the anti-rotation means 44, which prevents circumferential rotation of the annular member 40 relative to the seal ring 20.

In a fifth embodiment, shown in FIG. 12(a), one variation of the anti-pull-out means 43 and one variation of the anti-rotation means 44 are shown. FIGS. 12(b) and 12(c) show modifications of the fifth embodiment. In any of the above embodiment and modifications, the anti-pull-out means 43 and the anti-rotation means 44 are provided on the radially opposed abutment surfaces of the seal ring 20 and the annular member 40, which are separate members from each other.

In the fifth embodiment of FIG. 12(a), the anti-pull-out means 43 and the anti-rotation means 44 consist of recesses a and protrusions b formed on one and the other of the respective radially opposed abutment surfaces of the annular member 40 and the seal ring 20 and meshing with the radially opposed protrusions b and recesses a, respectively. In particular, the recesses a are formed in the outer peripheral surface 27b of the lip mounting portion 27 of the seal ring 20, while the protrusions b are formed on the inner peripheral surface 41b of the annular member 40. The recesses a and the protrusions b may extend the entire circumferences of the outer peripheral surface 27b and the inner peripheral surface 41b, respectively. Otherwise, the recesses a and the protrusions b may consist of a plurality of groups, each groups consisting of circumferentially spaced apart recesses or protrusions.

Due to engagement of the protrusions b and the recesses a, the recesses a and the protrusions b prevent (as the anti-pull-out means 43) axial separation of the annular member 40 and the seal ring 20 from each other. If the recesses a and the protrusions b are circumferentially spaced apart from each other (and thus circumferentially discontinuous), such recesses a and protrusions b can additionally prevent (as the anti-rotation means 44) circumferential rotation.

In FIG. 12(b), the protrusions b are formed on the outer peripheral surface 27b of the lip mounting portion 27 of the seal ring 20, while the recesses a are formed in the inner peripheral surface 41b of the annular member 40. In this case too, the recesses a and the protrusions b may extend the entire circumferences of the outer peripheral surface 27b and the inner peripheral surface 41b, respectively, or may be circumferentially spaced apart from each other.

Due to engagement of the protrusions b and the recesses a, the recesses a and the protrusions b prevent (as the anti-pull-out means 43) axial separation of the annular member 40 and the seal ring 20 from each other. If the recesses a and the protrusions b are circumferentially spaced apart from each other (and thus circumferentially discontinuous), such recesses a and protrusions b can additionally prevent (as the anti-rotation means 44) circumferential rotation.

In this example, each protrusion b has a radially outwardly tapering sectional shape, as taken along a plane including the axis of the bearing, and has an acutely angled (i.e. pointed) distal end.

The recesses a are shaped such that the protrusions b are snugly fitted in the respective recesses a. In other words, each recess a has a radially outwardly tapering sectional shape, as taken along a plane including the axis of the bearing, and has an acutely angled (i.e. pointed) distal end. With this arrangement, when the protrusions b are fitted in the respective recesses a, the annular member 40 and the seal ring 20 are kept in close contact with each other.

Each protrusion b has inner and outer (with respect to the axial direction of the bearing) abutment surfaces to be brought into abutment with the inner wall of the corresponding recess a, with the inner abutment surface tapered and the outer abutment surface extending perpendicular to the axis of the bearing. This further reduces the possibility of separation of the annular member 40 in the axial direction.

In either of the arrangements of FIGS. 12(a) and 12(b), since both the recesses a and the protrusions b are axially equidistantly spaced apart from each other, the axial relative position between the annular member 40 and the seal ring 20 can be changed by engaging the respective protrusions b in axially displaced different recesses a.

This in turn makes it possible to adjust the interference of an abutment portion 41d of the lip 41 when the abutment portion 41d becomes worn, and also to use the annular member 40, forming the lip 41, in a bearing of a different model number or use the annular member 40 together with a different seal ring 20. Provided at least one of the circumferentially continuous protrusions b or at least one group of protrusions b that are circumferentially spaced apart from each other are engaged in the corresponding recess a or recesses, it is possible to positively prevent axial separation of the annular member 40.

FIG. 12(c) shows a different anti-pull-out means 43/anti-rotation means 44, which comprises a coupling member c such as a pin or a bolt through which the annular member 40 and the seal ring 20 are coupled together. In the arrangement shown, a bolt is used as the coupling member c. The bolt is inserted in a hole 41g formed in the annular member 40 and brought into threaded engagement with a threaded hole 27d formed in the seal ring 20, thereby fixing the annular member 40 to the seal ring 20.

In this arrangement, in order to adjust the interference of the abutment portion 41d of the lip 41 when the abutment portion 41d becomes worn, or in order to use the annular member 40 in a bearing of a different model number or to use the annular member 40 together with a different seal ring 20, a new threaded hole is formed in the seal ring 20 at a location axially displaced from the original threaded hole 27d. Otherwise, for this purpose, a plurality of axially spaced apart threaded holes 27d may be formed in the seal ring 20 beforehand.

FIGS. 13(a) and 13(b) show a sixth embodiment, at least one protrusion b is formed outer peripheral surface of the seal ring 20 (namely, the outer peripheral surface 27b of the lip mounting portion 27) so as not to extend the entire circumference of the outer peripheral surface 27b, while at least one recess a in which the protrusion b is engageable is formed in the inner peripheral surface 41b of the annular member 40 so as not to extend the entire circumference of the inner peripheral surface 41b.

With the protrusion b engaged in the recess a, the protrusion b and the recess a prevent (as the anti-rotation means 44) circumferential relative rotation between the annular member 40 and the seal ring 20.

If the recess a and the protrusion b do not extend the entire axial lengths of the inner peripheral surface of the annular member 40 and the outer peripheral surface of the seal ring 20, respectively, when the protrusion b is engaged in the recess a, the protrusion b and the recess a prevent (as the anti-pull-out means 43) axial separation of the annular member 40.

Contrary to the above, at least one protrusion b may be formed on the inner peripheral surface of the annular member 40 so as not to extend the entire circumference of the inner peripheral surface, and at least one recess a may be formed in the outer peripheral surface of the seal ring 20 so as not to extend the entire circumference of the outer peripheral surface.

FIGS. 14(a) and 14(b) show seventh embodiments of the present invention, in which, as with the fourth embodiment, shown in FIG. 6, the lip mounting portion 27 of the seal ring 20 has a sectional shape of the Japanese character "コ".

In the embodiment of FIG. 14(a), the outer peripheral surface 41e of the annular member 40, which forms the lip 41, is a tapered surface 41f, i.e. a surface of which the diameter gradually increases toward the end surface of the outer race 11 so that the annular member 40 can be easily inserted into the lip mounting portion 27.

The lip 41 and the seal ring 20 are designed such that in the state of FIG. 14(a), the lip 41 and the seal ring 20 are in contact with each other with an interference fit on the left-hand side of FIG. 14(a). The surfaces of the seal ring 20 between which the annular member 40 is inserted may be straight (cylindrical) surfaces.

In the embodiment of FIG. 14(b), the anti-pull-out means 43 (for preventing axial separation of the annular member 40) is provided on the radially outer portion of the annular member 40. This anti-pull-out means 43 comprises a plurality of circumferentially extending groove-shaped recesses a formed in the outer peripheral surface 41e of the annular member 40. The recesses a serve to increase the contact surface pressure between the annular member 40 and the seal ring 20 per unit area, thus preventing (as the anti-pull-out means 43) the annular member 40 and the seal ring 20 from axially separating from each other, and also preventing (as the anti-rotation means 44) relative rotation between the annular member 40 and the seal ring 20.

In the arrangement in which the seal ring 20 has the lip mounting portion 27 having the "コ"-shaped section, the anti-pull-out means 43 and the anti-rotation means 44 which are used in any of the embodiments other than the embodiments of FIGS. 14(a) and 14(b) may be used.

Figure 15:
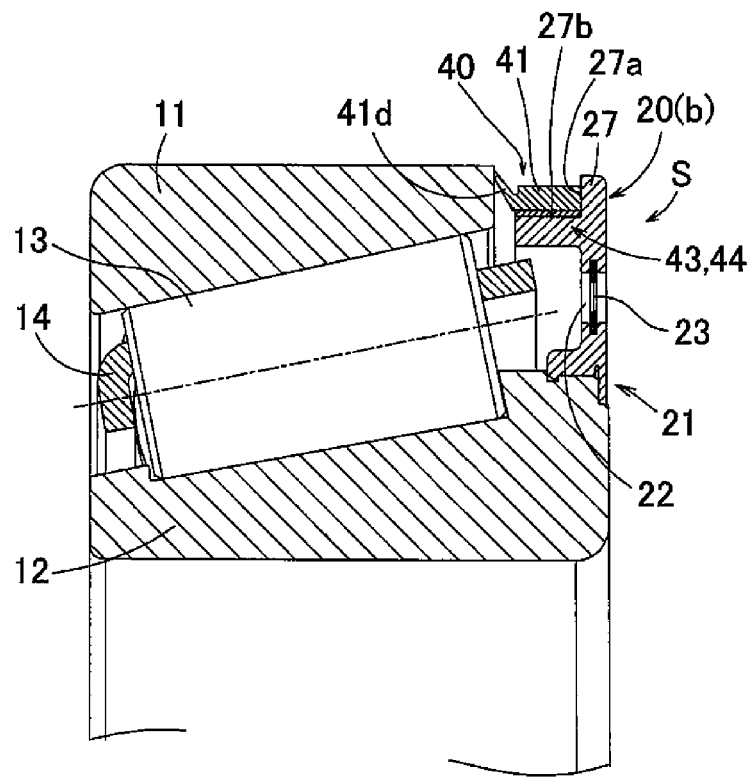
FIG. 15 is an enlarged sectional view of a portion of an eighth embodiment of the present invention.

FIG. 15 shows an eighth embodiment of the present invention, in which fine protrusions and recesses are formed on the outer peripheral surface of the seal ring 20 that is brought into abutment with the annular member 40 (namely, the outer peripheral surface 27b of the lip mounting portion 27). The fine protrusions and recesses are formed by subjecting the surface 27b to roughening surface treatment. Such fine protrusions and recesses increase the friction between the annular member 40 and the seal ring 20, thus preventing (as the anti-pull-out means 43) axial separation of the annular member 40 and the seal ring 20 from each other, and also preventing (as the anti-rotation means 44) relative rotation between the annular member 40 and the seal ring 20. Such fine protrusions and recesses may be instead formed on the axial end surface of the seal ring 20 that is brought into abutment with the annular member 40 (namely, the inner end surface 27a of the lip mounting portion 27).

The roughening surface treatment for forming such fine protrusions and recesses may comprise a satin finish, surface texturing, or straight knurling. In order to form such fine protrusions and recesses, corresponding protrusions and recesses may be formed on a mold for forming the seal ring 20. This avoids the necessity to form the fine protrusions and recesses after forming the seal ring 20 by molding.

If as the anti-pull-out means 43 and the anti-rotation means 44, the annular member 40 and the seal ring 20 are adhesively fixed together too, the above described fine protrusions and recesses may be formed beforehand in order to increase the bond strength between the seal ring 20 and the annular member 40.

The seal ring 20 and the annular member 40 may be adhesively bonded together using an ordinary adhesive, or by vulcanization, as mentioned earlier. These members are preferably bonded together between the axially outer end surface of the annular member 40 and the inner end surface 27a of the lip mounting portion 27, and between the inner peripheral surface 41b of the annular member 40 and the outer peripheral surface 27b of the lip mounting portion 27.

In the radial direction, the annular member 40 is preferably not only adhesively bonded to the seal ring 20 but also fitted on the seal ring 20 with an interference fit, in order to more reliably prevent slippage between these members in the rotational direction.

Each of the above-mentioned specific arrangements may be used alone or may be combined with another or other arrangements to form the anti-pull-out means 43 and/or the anti-rotation means 44.

Figure 16:
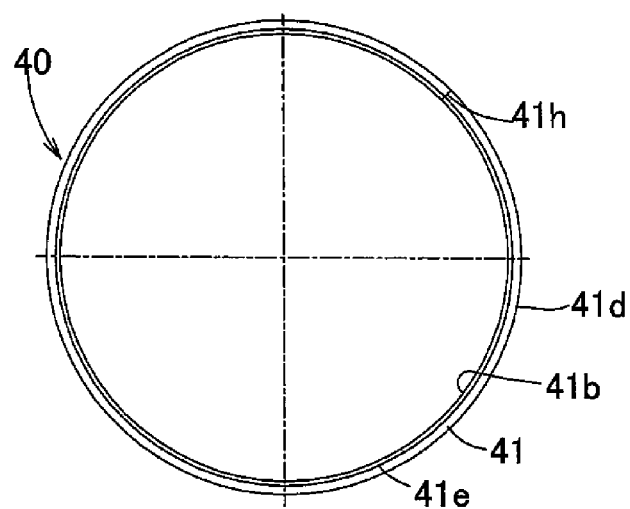
FIG. 16 is a side view of an annular member of a ninth embodiment of the present invention.

FIG. 16 shows a ninth embodiment of the present invention, in which the annular member 40 is an elongated member having circumferential and formed into an endless annular shape by bonding the circumferential ends together at a bonding portion 41h.

The annular member 40 is preferably formed in this way especially if the seal ring 20 is used in a bearing having a large diameter, and due to its large diameter, it is impossible, or an expensive mold is necessary, to form the annular member 40 into a monolithic annular shape. The circumferential ends may be bonded together at the bonding portion 41h by means of an adhesive or by vulcanization.

In any of the above embodiments, the filters 23 may be formed of a synthetic resin such as polyamide, or a metal such as stainless steel, as mentioned earlier. Filters 23 made of synthetic resin are rust-resistant and lightweight. Filters 23 made of metal are resistant to hard foreign matter, and durable.

In any of the embodiments, the filters 23 and the frame members 42 are detachably mounted to the seal ring 20. Instead, however, the frame members 42 may be omitted, and the filters 23 may be directly and detachably mounted to the oil flow holes 22 of the seal ring 20. If only the filters 23 are fitted in the oil flow holes 22, the filters 23 are preferably formed of a relatively rigid material.

In any of the above embodiments, the net-shaped filters 23 have preferably mesh sizes of 0.3 to 0.7 mm, particularly preferably 0.5 mm.

Figure 17:
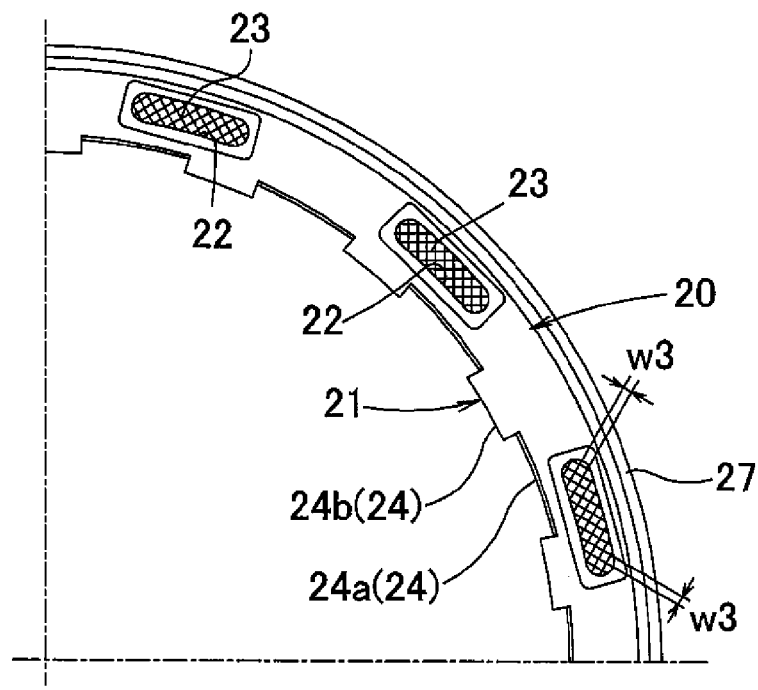
FIGS. 17(a) and 17(b) describe the mesh sizes of filters.
Figure 17:
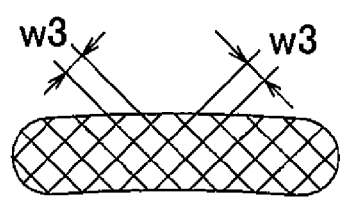

The term "mesh sizes" herein used refers to the sizes of the openings of the net-shaped filters 23, which are indicated by "w3" in FIGS. 17(a) and 17(b).

If the mesh sizes of the filters 23 are too large, large foreign objects tend to enter the bearing, and form impressions large enough to detrimentally influence the life of the bearing, on the raceways and rolling surfaces of the bearing. If the mesh sizes are too small, foreign objects could clog the filters 23, making it impossible to supply lubricating oil into the bearing.

A life test was conducted to determine the relationship between the sizes of impressions formed on the raceways and rolling surfaces of the bearing and the reduction rate of the life of the bearing due to the impressions. The results of the life test indicate that impressions smaller than a certain value do not influence the life of the bearing. An experiment was conducted to determine the relationship between the mesh sizes of the filters 23 and the sizes of impressions formed by foreign objects that have passed through the filters 23.

Figure 18:
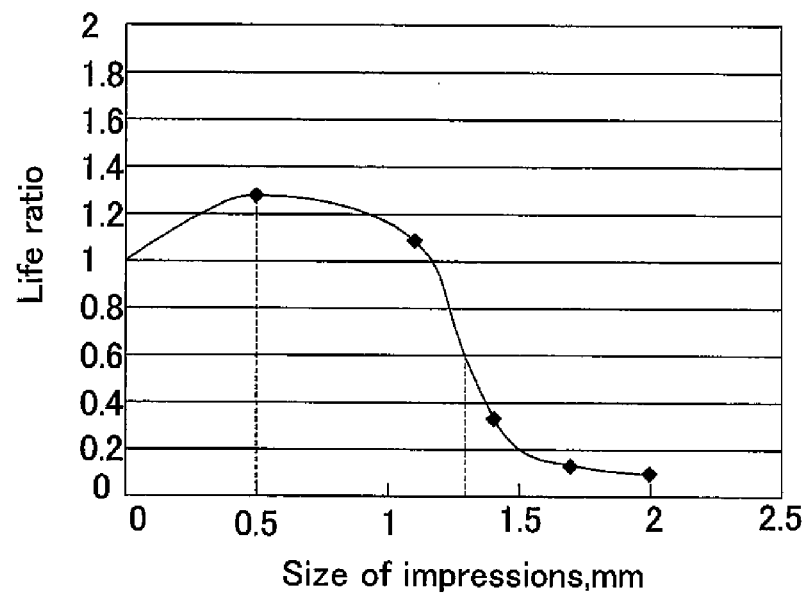
FIG. 18(a) is a graph showing the relationship between the size of impressions and the reduction rate of life.
FIG. 18(b) is a graph showing the relationship between the mesh size and the size of impressions.
Figure 18:
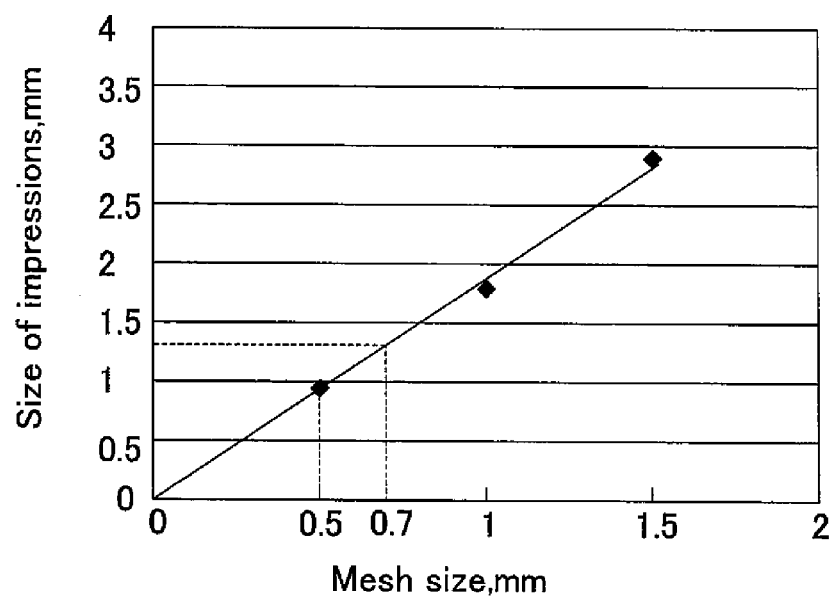

FIGS. 18(a) and 18(b) show the results of the test and the experiment, respectively. In particular, FIG. 18(a) shows the relationship between the sizes of impressions formed on the raceways and rolling surfaces of the bearing and the reduction rate of the life of the bearing due to the impressions, while FIG. 18(b) shows the relationship between the mesh sizes of the filters and the sizes of impressions formed by foreign objects that have passed through the filters.

The test was conducted using tapered roller bearings measuring 30 mm in inner diameter, 62 mm in outer diameter and 17.25 mm wide, with a radial load of 17.65 kN and an axial load of 1.47 kN applied to the respective bearings, while rotating the shafts at 2000 min$^{-1}$.

During the experiment, it was confirmed that when the sizes of impressions exceeded 1 mm, the life of the bearings decreased sharply. It was also confirmed that in order to prevent entry of foreign objects that could form impressions larger than 1 mm, the mesh sizes have to be not larger than 0.5 mm. Thus, it was confirmed that the life of the bearings is sufficient if the mesh sizes are not larger than 0.5 mm. When the mesh sizes were not larger than 0.7 mm, impressions formed were not larger than 1.3 mm. If impressions formed are not larger than 1.3 mm, it is possible to keep the reduction rate of the life of the bearing to an acceptable level (60% of the life of the bearing having no impressions). To prevent clogging of the filters, the mesh sizes of the filters are preferably 0.3 mm or over.

The bearing of any of the embodiments is used as a bearing 10 in a travel unit 4 used in a large-sized construction machine, of which the outer race 11 is rotatable and the inner race 12 is stationary. The seal ring 20 is in engagement with the inner race 12 or the stationary race, so that the filters 23 are never moved around the axis of the bearing, and thus, foreign objects caught by the filters 23 are less likely to be scattered.

The bearing 10 to which the seal ring 20 is mounted is not limited in type, and may be a tapered roller bearing, of which the rolling elements 13 are tapered rollers, or any other type of bearing, such as a deep groove ball bearing or an angular ball bearing, of which the rolling elements 13 are balls, a cylindrical roller bearing, of which the rolling elements are cylindrical rollers, or a self-aligning roller bearing, of which the rolling elements are spherical rollers. Of these bearings, a tapered roller bearing is advantageous because its outer race 11 is easily separable, so that the annular member 40 is easily replaceable with a new one.

When the seal ring 20 (seal member 5), which carries the filters 23, is used in a large-sized construction machine and any other machine, the seal member S is preferably mounted to face the outside of the machine. With this arrangement, since foreign objects mainly originate from outside the machine, the seal member can effectively prevent entry of foreign objects into the bearing.

DESCRIPTION OF THE NUMERALS

1. Construction machine (Dump truck for use in a mine)
2. Chassis
3. Tire (of drive wheel)
4. Travel unit
5. Driving source (travel motor)
6. Shaft
7. Spindle
8. Rim
9. Wheel body
10. Rolling bearing
11. Outer race
11a. Raceway
12. Inner race
12a. Raceway
12b. Large-diameter flange
12c. Small-diameter flange
13. Tapered roller (Rolling element)
14. Retainer
20. Seal ring
21. Engaging portion
22. Oil flow hole
22a. Inner surface
22b, 22c. Recess
23. Filter
24. Protrusion
24a. Inner protrusion
24b. Outer protrusion
25. Wall portion
27. Lip mounting portion
27a. Inner end surface
27b. Outer peripheral surface
27c. End edge (Shoulder)
28. Dimension adjusting member
29. Engaging means
29a. Engaging projection
29b. Engaging recess
30. Seal groove
30a. Inner seal groove
30b. Outer seal groove
31. Seal ring fitting portion
32. Inner race fitting portion
40. Annular member
41. Lip
41a. Outer end surface
41b. Inner peripheral surface
41c. Shoulder
41d. Abutment portion
41e. Outer peripheral surface
41f. Tapered surface
41g. Threaded hole
41h. Bonding portion
42. Frame member
42a. Outer edge portion
42b. Curved portion
42c, 42f. Tapered portion
42d. Spherical protrusion
42e. Anti-separation protrusion
50. Planetary gear mechanism

What is claimed is:

1. A rolling bearing comprising:
    an outer race;
    an inner race;
    rolling elements disposed between the outer race and the inner race, the outer race and the inner race defining a bearing space therebetween having first and second openings at first and second ends of the bearing space, respectively;
    a seal ring made of resin or metal, and covering the first opening;
    a filter detachably mounted in an oil flow hole by fitting, the oil flow hole being formed in the seal ring and the filter being configured to catch foreign objects contained in lubricating oil, wherein the seal ring is engaged by one of the outer race and the inner race; and an annular member made of a material softer than a material forming the seal ring and fixedly mounted to the seal ring, the annular member forming a lip which is kept in abutment with the other of the outer race and the inner race or faces the other of the outer race and the inner race with a gap left therebetween.

2. The rolling bearing of claim 1, wherein the seal ring is made of a glass fiber-reinforced resin, and the annular member is made of rubber.

3. The rolling bearing of claim 2, wherein the filter has an outer edge which is formed by insert molding so as to be integral with a frame member, and wherein the frame member is detachably mounted in the oil flow hole of the seal ring.

4. The rolling bearing of claim 2, wherein the annular member is fitted on a radially outer surface of the seal ring with an interference fit.

5. The rolling bearing of claim 2, wherein the annular member is positioned in an axial direction of the bearing by an inner end surface of the seal ring.

6. The rolling bearing of claim 2, further comprising an anti-pull-out arrangement disposed between the annular member and the seal ring, and configured to prevent separation of the annular member and the seal ring from each other in an axial direction of the bearing.

7. The rolling bearing of claim 2, further comprising an anti-rotation arrangement disposed between the annular member and the seal ring, and configured to prevent rotation of the annular member and the seal ring relative to each other in a circumferential direction.

8. The rolling bearing of claim 2, wherein the seal ring includes a lip mounting portion having a sectional shape of a Japanese character "コ", wherein the annular member has a radially inner surface, a radially outer surface, and an axial side surface, and wherein the annular member is fitted in the lip mounting portion such that the radially inner surface or the radially outer surface, and the axial side surface are directly or indirectly in abutment with an inner surface of the lip mounting portion.

9. The rolling bearing of claim 1, wherein the filter has an outer edge which is formed by insert molding so as to be integral with a frame member, and wherein the frame member is detachably mounted in the oil flow hole of the seal ring.

10. The rolling bearing of claim 1, wherein the annular member is fitted on a radially outer surface of the seal ring with an interference fit.

11. The rolling bearing of claim 1, wherein the annular member is positioned in an axial direction of the bearing by an inner end surface of the seal ring.

12. The rolling bearing of claim 11, wherein the bearing is configured such that a dimension adjusting member is disposed between the annular member and the inner end surface of the seal ring, whereby an interference between the lip and the other of the inner race and the outer race is adjustable by means of the dimension adjusting member.

13. The rolling bearing of claim 1, further comprising an anti-pull-out arrangement disposed between the annular member and the seal ring, and configured to prevent separation of the annular member and the seal ring from each other in an axial direction of the bearing.

14. The rolling bearing of claim 1, further comprising an anti-rotation arrangement disposed between the annular member and the seal ring, and configured to prevent rotation of the annular member and the seal ring relative to each other in a circumferential direction.

15. The rolling bearing of claim 1, wherein the seal ring includes a lip mounting portion having a sectional shape of a Japanese character "コ", wherein the annular member has a radially inner surface, a radially outer surface, and an axial side surface, and wherein the annular member is fitted in the lip mounting portion such that the radially inner surface or the radially outer surface, and the axial side surface are directly or indirectly in abutment with an inner surface of the lip mounting portion.

* * * * *